United States Patent [19]
Nakamura

[11] Patent Number: 6,084,635
[45] Date of Patent: *Jul. 4, 2000

[54] SOLID STATE IMAGE SENSOR

[75] Inventor: Junichi Nakamura, Torrance, Calif.

[73] Assignee: Olympus Optical Co., Ltd., Tokyo, Japan

[*] Notice: This patent is subject to a terminal disclaimer.

[21] Appl. No.: 08/627,322

[22] Filed: Apr. 1, 1996

Related U.S. Application Data

[63] Continuation of application No. 08/121,116, Sep. 13, 1993.
[51] Int. Cl.[7] .................................................. H04N 5/335
[52] U.S. Cl. ................................................. 348/302; 348/308
[58] Field of Search .................................. 348/302, 308; 364/807, 819, 820, 826, 841, 861, 862; 395/24, 25

[56] References Cited

U.S. PATENT DOCUMENTS

| | | | |
|---|---|---|---|
| 4,831,658 | 5/1989 | Umeda et al. | 382/272 |
| 5,258,657 | 11/1993 | Shibara et al. | 395/24 |

OTHER PUBLICATIONS

Darling, et al.–System Issues in The Implementation of Sensory Neural Network Photodetector Arrays; 1991; IEEE Pacific Rim Conference on Communications, Computers and Signal Processing; pp. 242–245.

Fossum; Architectures for Focalplane Image Processing; Aug. 1989, Optical Engineering, vol. 28 No. 8; pp. 865–871.

*Primary Examiner*—Wendy Garber
*Assistant Examiner*—Andrew B. Christensen
*Attorney, Agent, or Firm*—Kenyon & Kenyon

[57] ABSTRACT

An image sensor is described which provides a smoothed output without storing data from photoelectric conversion elements at off-chip data storage device(s). The image sensor includes a plurality of neuron MOSFETs and a plurality of photoelectric conversion elements, each photoelectric conversion element corresponding to one of the plurality of neuron MOSFETS. Each neuron MOSFET has at least a primary input gate, two or more secondary input gates and an output. The primary input gate of each neuron MOSFET is coupled to its corresponding photoelectric conversion element. The secondary input gates are coupled to selected ones of the other photoelectric conversion elements. A switch is coupled to the output of each of the plurality of neuron MOSFETs. The switch selectively couples each of the plurality of neuron MOSFETs to an output of the image sensor. In order to provide edge detection, a plurality of MOSFETs are provided, each having an input coupled to a respective photoelectric conversion element. A second switch is provided to selectively couple an output of each MOSFET to an pixel output of the image sensor. When the difference between the smoothed output and pixel output changes drastically over a short distance (e.g. 2 photoelectric conversion elements), an edge is identified.

17 Claims, 20 Drawing Sheets

| 1/9 | 1/9 | 1/9 |
|---|---|---|
| 1/9 | 8/9 | 1/9 |
| 1/9 | 1/9 | 1/9 |

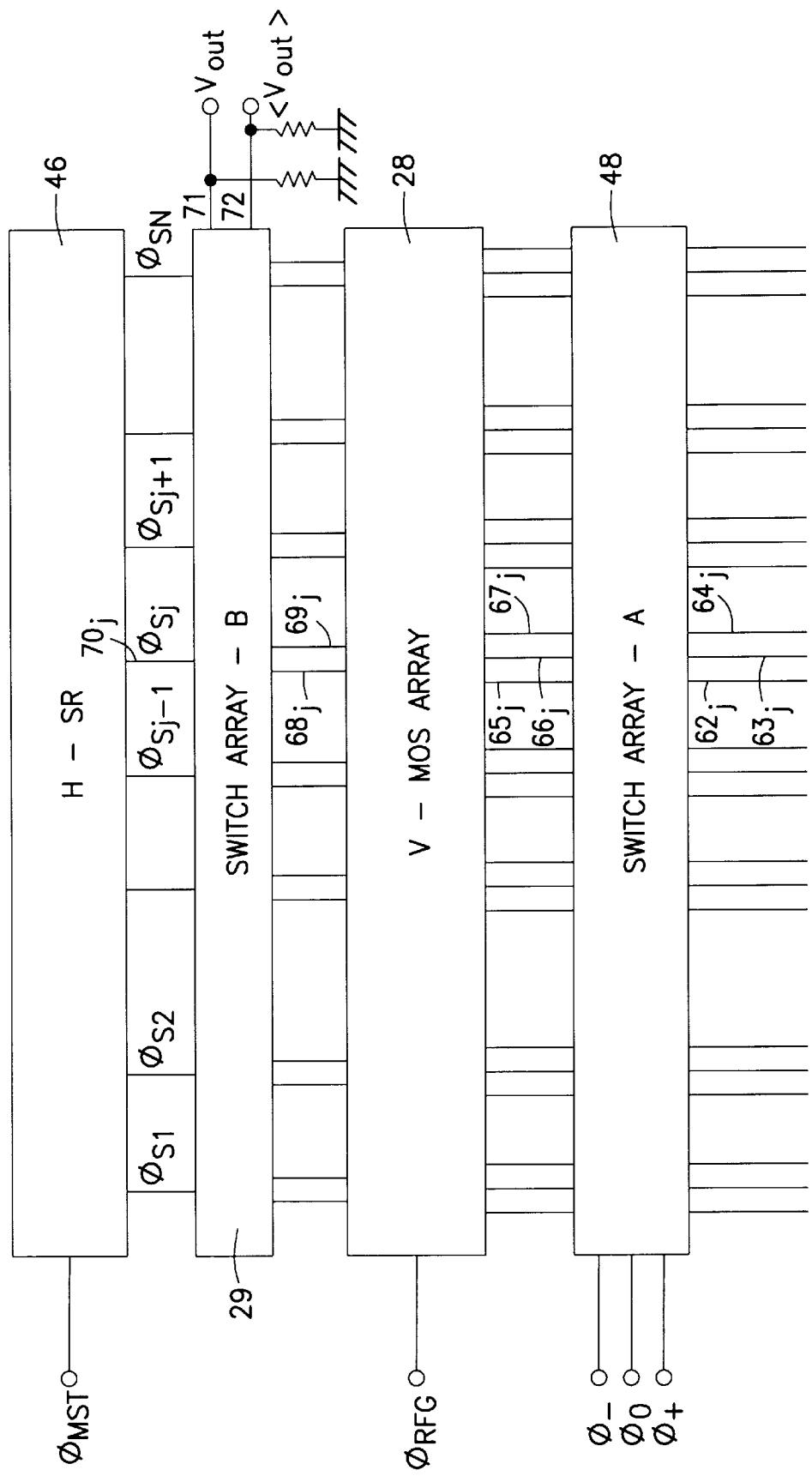
Fig. 16a.1

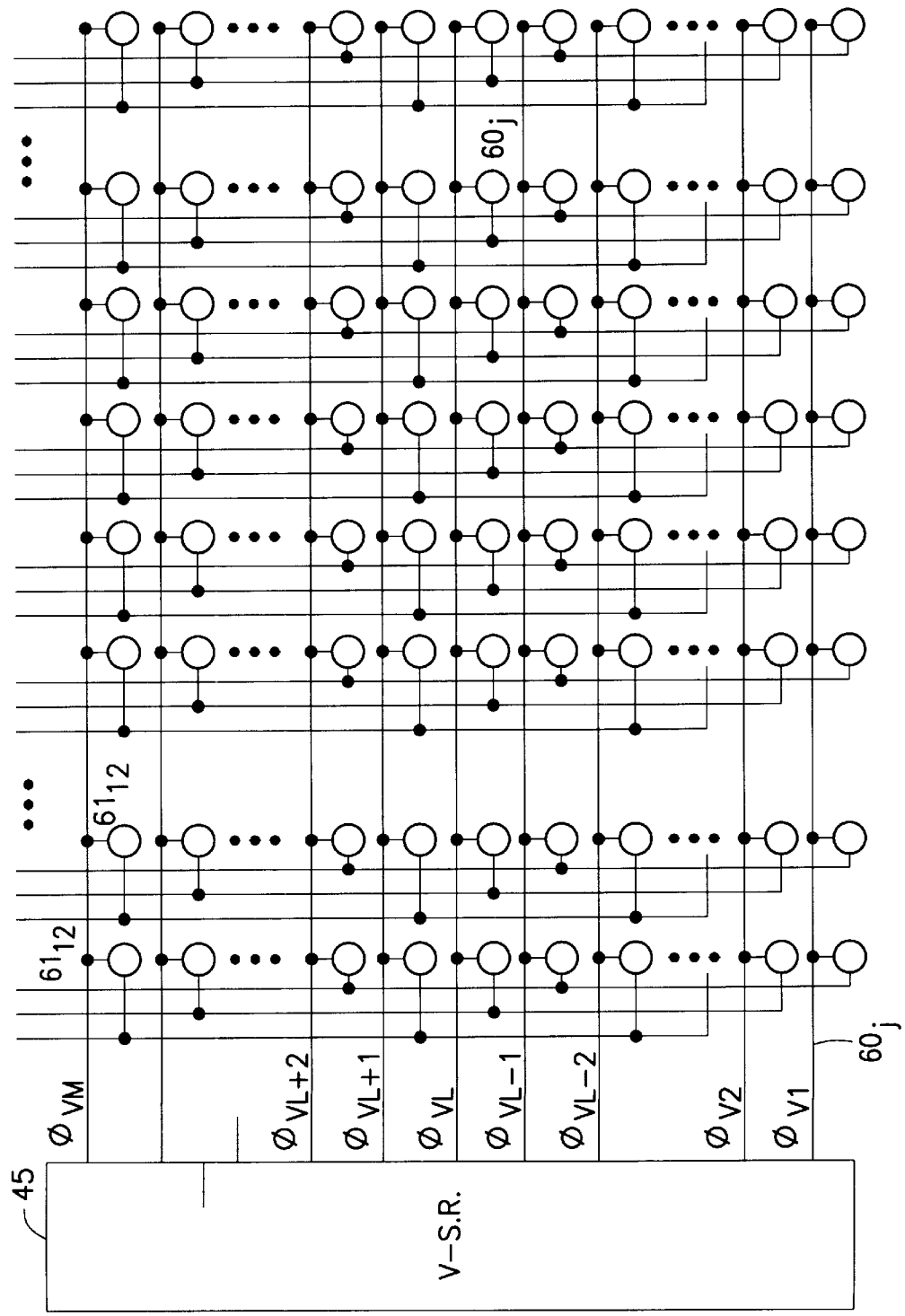
Fig. 16a.2

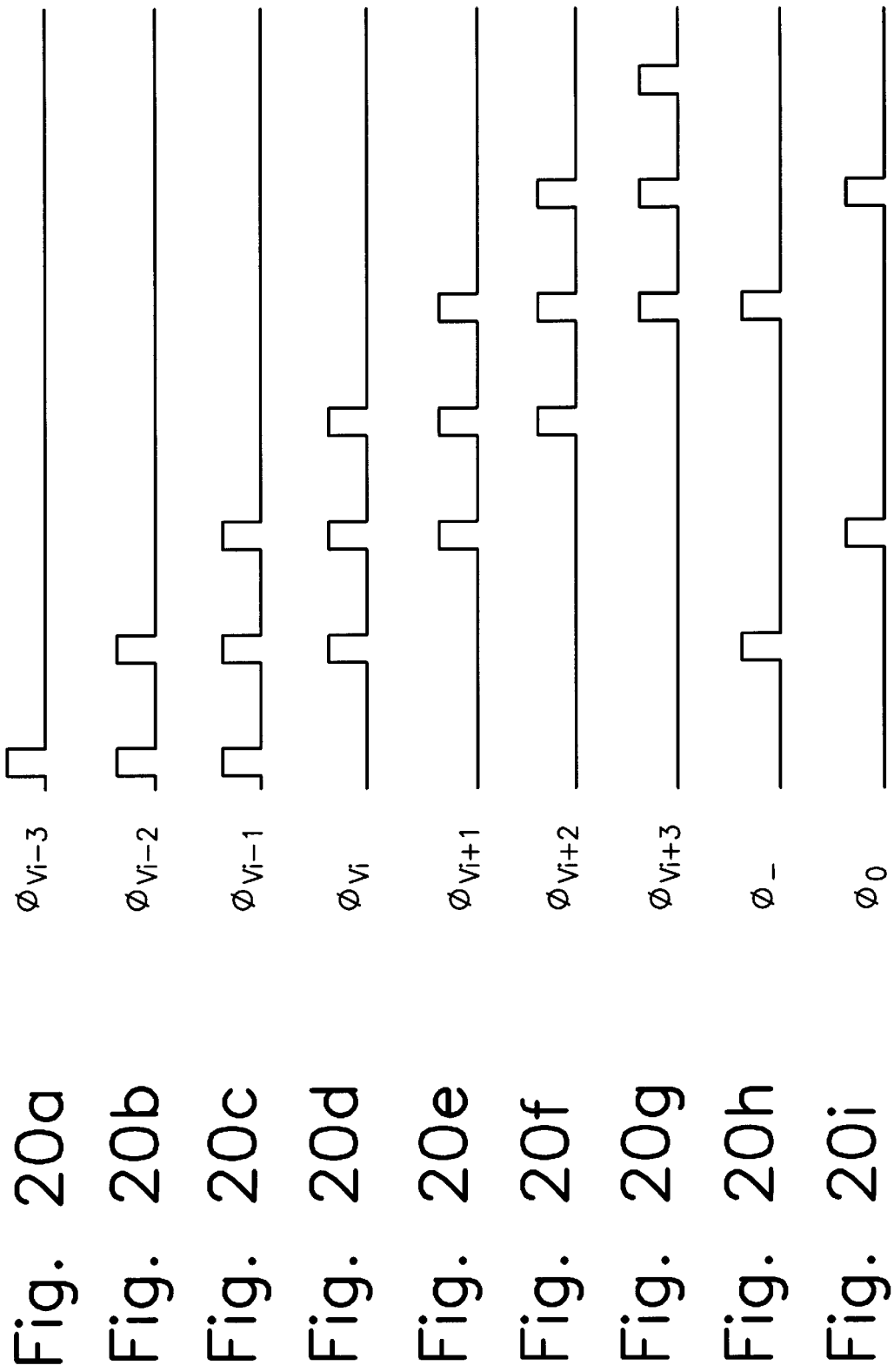

Fig. 20j  $\phi_+$
Fig. 20k  $\phi_{RFG}$
Fig. 20L  $\phi_{MST}$
Fig. 20m  $v_{OUT}$
Fig. 20n  $\langle v_{OUT} \rangle$
Fig. 20o  $v_{OUT} - \langle v_{OUT} \rangle$

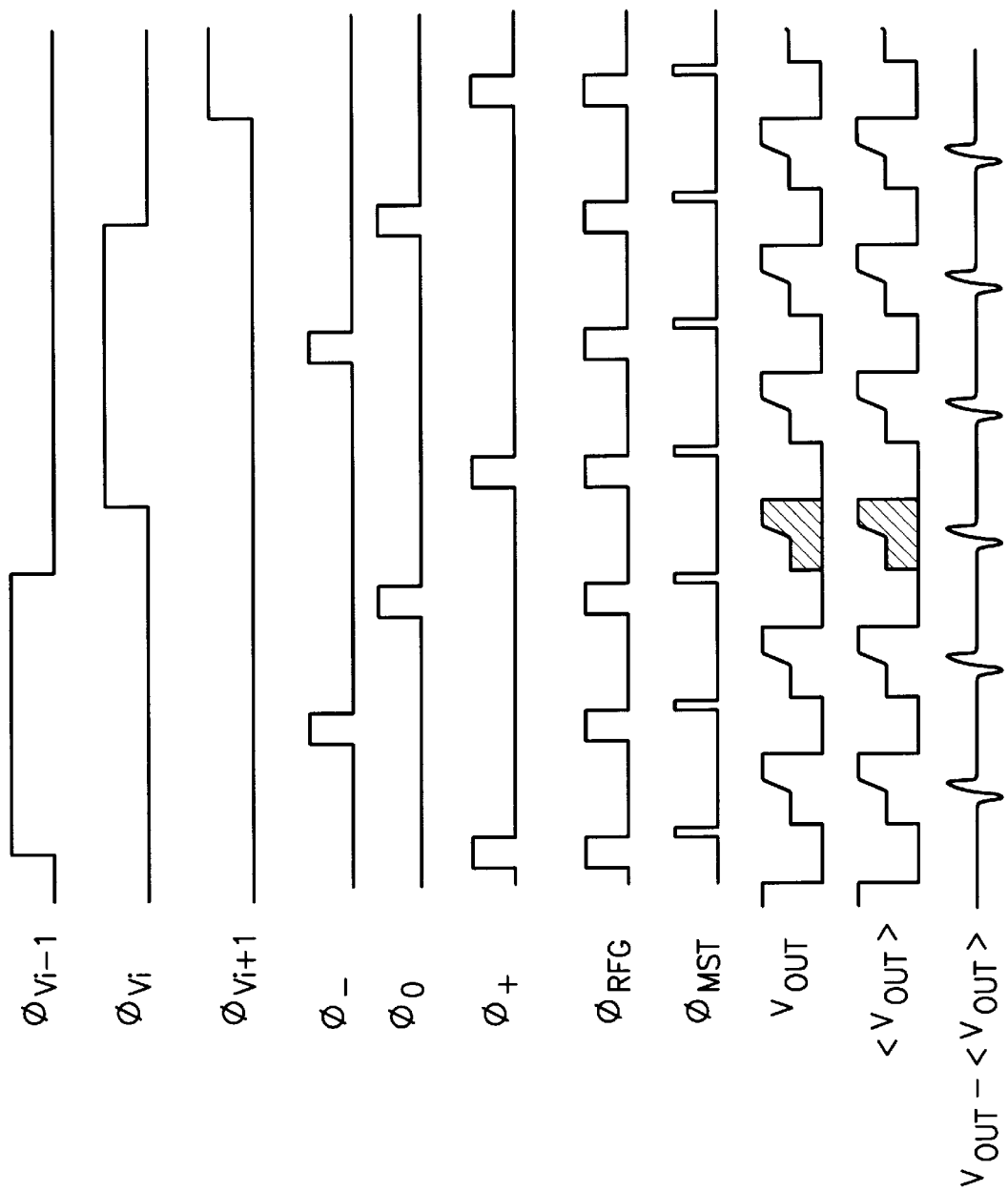

SOLID STATE IMAGE SENSOR

RELATED APPLICATIONS

The specification of application Ser. No. 08/121,116, filed Sep. 13, 1993, and entitled SOLID STATE IMAGE SENSOR is hereby incorporated by reference in its entirety.

FIELD OF THE INVENTION

The present invention relates to the field of image input devices.

BACKGROUND OF THE INVENTION

Solid state image sensors are well known in the art. They are used, for example, in video cameras and fax machines. In a conventional image sensor, image processing occurs in two stages: preprocessing and postprocessing.

In accordance with the real time image preprocessing stage, image data is retrieved from photoelectric conversion elements (e.g. photodiodes) and stored in a frame memory. Once the image data is stored in the frame memory, it is processed to provide edge detection or image smoothing. Image smoothing is a process by which noise is removed from the photoelectric conversion element data. Edge detection is a process by which the edge of an input image is detected. In image input devices with solid state image pick-up elements, the image data retrieval is generally performed using a local mask. Local masks perform peripheral processing in an area, for example, from 2 by 2 photoelectric conversion elements to 9 by 9 photoelectric conversion elements. This peripheral processing is performed over the entire image and it is necessary to access each photoelectric conversion element's data repeatedly to complete the image pre-processing.

Photoelectric conversion elements which enable non-destructive readout of light signals have also been used for image preprocessing such as edge detection and image smoothing. Non-destructive readout (NDRO) photoelectric conversion elements, such as charge modulation devices (CMD) and static induction transistors (SIT), enable faster pre-processing of an image while utilizing a simpler circuit because it eliminates the need for a frame memory. More specifically, since the charge of an NDRO photoelectric conversion element can be read repeatedly, there is no need to store the image data in a separate storage device. Unfortunately, prior art image processors utilizing NDRO photoelectric conversion elements still require a processor including, for example, a multiplier and adder, because in order to provide a smoothed output for a given photoelectric conversion element, a weighted average of the data from several photoelectric conversion elements must be obtained. Such a process can become computationally intensive thereby increasing the size and cost of the system. For example, to produce a weighted average for a 2×2 local mask requires 4 analog multipliers and an adder. For a 3×3 local mask, 9 multipliers are required.

In order to provide edge detection, prior art circuits compared the photoelectric conversion element data for each photoelectric conversion element with an average of the photoelectric conversion element data from some or all of the other photoelectric conversion elements (e.g., the smoothed output). If the difference changes drastically over a short distance, an edge is detected. Thus, edge detection requires even more processing than image smoothing.

Another prior art image preprocessing technique, called "thresholding", is used to produce a two-valued (binary) image. For example, in a facsimile machine, it is often desirable to vary the threshold at which the machine recognizes the presence (or absence) of a point on the page. Such a variable threshold is necessary, for example, where the document has a homogeneous background (e.g. blue paper as opposed to white paper). In prior art systems, a variable threshold was calculated based upon previously stored photoelectric conversion element data. Such systems required an additional processor to analyze this previously stored photoelectric conversion element data and to provide a new threshold to compensate for the background level on the document.

For example, it is known in the prior art to convert the charge at each photoelectric conversion element into a digital value using an A/D converter and to store the digitized data from all the photoelectric conversion elements in a frame memory. It is known that a proper threshold (the point at which the image sensor distinguishes between "text" and "background") can be set by providing a graph (histogram) which shows the number of photoelectric conversion elements as a function of charge level. Although several algorithms have been developed to determine the threshold value based on such a histogram, these methods require massive computations.

Moreover, in some cases, different portions of a document have different background levels. In order to compensate for such stains or shading in a document, prior art systems derived several local thresholds in the manner described above from a plurality or histograms thereby further increasing the complexity and cost of processing. Therefore, a need exists for a solid state image sensor which provides signal processing while eliminating the above-mentioned problems of the prior art.

SUMMARY OF THE INVENTION

In accordance with the present invention, neuron Metal Oxide Semiconductor Field Effect Transistors ("neuron MOSFETS") are utilized to provide an image preprocessor which utilizes fewer components than prior art devices.

A neuron MOSFET is a MOSFET which includes a plurality of input gates coupled to a floating gate. It is known that the "on" and "off" voltages of a neuron MOSFET are a function of the weighted sum of the input signals at its input gates. If the weighted sum is greater than $V_{th}$, the neuron MOSFET is "on." If the weighted sum is less than $V_{th}$ the neuron MOSFET is "off."

According to a first embodiment of the present invention, a two valued variable threshold image sensor is provided. As stated previously, while two-valued variable threshold image processing systems are known in the art, they require an A/D converter, a storage device, and a processor to compensate for the background level of a document. The first embodiment of the present invention provides this function without the use of A/D converters or storage devices.

In accordance with the first embodiment of the present invention, a plurality of photoelectric conversion element circuits are coupled to the outputs of a shift register which operates to generate control signals which sequentially read the output of each photoelectric conversion element circuit to an output line $V_{out}$. Each photoelectric conversion element circuit includes at least one neuron MOSFET for outputting a logic "1" when the voltage of a respective photoelectric conversion element is above a variable threshold and for outputting a logic "0" when the voltage of the respective photoelectric conversion element is below the variable threshold. The photoelectric conversion element circuit further includes a first switch, coupled to the output of the neuron MOSFET, the output of the shift register, and the line $V_{out}$. The first switch couples the output of the neuron MOSFET to $V_{out}$ in response to a read signal from the shift register. Each photoelectric conversion element circuit may further include a second switch for resetting its photoelectric conversion element.

Each neuron MOSFET includes at least a first input gate coupled to the respective photoelectric conversion element and a second input gate coupled to a BIAS signal for providing a variable threshold. The BIAS signal is coupled to a BIAS generator which monitors the output line $V_{out}$ and increases the BIAS signal in response to a decrease in $V_{out}$. The increase in the BIAS signal causes a decrease in the variable threshold thereby compensating for shading in the document.

In accordance with a second embodiment of the present invention, a smoothed output image sensor is provided.

It is known in the prior art to provide a smoothed output image sensor by reading the outputs of each photoelectric conversion element from an image sensor and then manipulating this photoelectric conversion element data in order to obtain a smoothed image.

In accordance with the smoothed output image sensor of the present invention, however, a smoothed output is generated directly from the image sensor thereby eliminating the computationally intensive processing of conventional imaging systems. An equal number (N) of photoelectric conversion elements ($P_1$–$P_N$) and neuron MOSFETs ($M_1$–$M_N$) are provided. Each neuron MOSFET includes (2a+1) gate inputs ($Mn_k$), where –a<=k<=a and 2a+1<n. For a neuron MOSFET $M_N$, gate $Mn_k$ is coupled to $P_{N+k}$. The output of each neuron MOSFET is the weighted average of the (2a+1) photoelectric conversion elements coupled to its gate inputs. The weight accorded to each input gate is a function of the area of the input gate. The neuron MOSFET output is coupled to an output <$V_{out}$> by a switch which is responsive to a read signal from a shift register. The shift register operates to sequentially read the smoothed output of each neuron MOSFET into <$V_{out}$>.

In accordance with a third embodiment of the present invention, an edge detection image sensor is provided using neuron MOSFETS. In accordance with the third embodiment of the present invention, a smoothed output <$V_{out}$> is obtained in the same manner as described above with regard to the smoothed output image sensor of the present invention. In addition, a conventional nMOSFET is coupled to each photoelectric conversion element to provide a pixel output $V_{out}$ and a difference D=$V_{out}$–<$V_{out}$> is monitored. An edge is detected whenever the difference D changes drastically over a short distance (e.g. a few pixels). Since the smoothed output is obtained directly from the neuron MOSFET, a simple differential amplifier can be used to calculate the difference D and the computationally intensive processing of the prior art is thereby eliminated.

In accordance with a fourth embodiment of the present invention, the variable threshold two valued output sensor of the first embodiment is combined with the smoothed output image sensor of the second embodiment and the edge detection image sensor of the third embodiment. In accordance with this fourth embodiment of the present invention, stains or shading (e.g., uneven illumination) in a document are compensated for without the use of A/D converters or storage devices. In accordance with this embodiment, the nMOSFET described above with regard to the third embodiment is replaced with a neuron MOSFET with two input gates. A first input gate of each neuron MOSFET is coupled to its respective photoelectric conversion element and the second is coupled to a signal $V_{bias2}$. $V_{bias2}$ is coupled to the output of a BIAS generator. The BIAS generator monitors the output line <$V_{out}$> and increases $V_{bias2}$ in response to a decrease in $V_{out}$. The increase in $V_{bias2}$ causes a decrease in the variable threshold thereby compensating for stains and shading in the document. In this manner the image sensor of the fourth embodiment of the present invention provides compensation for stains and shading (in addition to the background level correction of the first embodiment) by monitoring the smoothed output and changing the threshold value for the photoelectric conversion elements.

Moreover, while the first, second, third, and fourth embodiments have been described above with respect to a linear array of photoelectric conversion elements, it should be clear that the photoelectric conversion elements could also be configured in a matrix by simply adding, for example, a second shift register and control circuitry for accessing the photoelectric conversion elements as illustrated below.

BRIEF DESCRIPTION OF THE DRAWINGS

FIG. 16(a) shows an image sensor including a photoelectric conversion element matrix and providing an edge detection function according to a fifth embodiment of the present invention.

FIGS. 20(a–o) shows a timing chart for the circuit of FIGS. 16(a) and 19(a).

FIGS. 20(p–z) shows a timing chart for the circuit of FIGS. 16(b) and 19(b).

DETAILED DESCRIPTION OF THE DRAWINGS

A prior art system for image preprocessing in image input devices with solid state image pick-up elements will be explained with reference to the prior art circuit of FIG. 1. Such a system can be adapted, for example, to provide a smoothed output image sensor, or an edge detection image sensor. In accordance with this prior art system, NDRO photoelectric conversion elements are used as photoelectric conversion elements.

An image input device 50 has a vertical scanning circuit 51; a horizontal scanning circuit 52; a set of non-destructive readable conversion elements (hereinafter "NDRO elements") 54-11 through 54-44 whose control terminals are connected with the vertical scanning circuit 51 via lead lines 53-1, 53-2, 53-3, 53-4. The NDRO elements 54-11 through 54-44 are further coupled, via their source lines, to a set of horizontal selection switches 56-1a, 56-1b through 56-4a, 56-4b. The set of horizontal selection switches 56-1a, 56-1b through 56-4a, 56-4b are connected to the horizontal scanning circuit 52 via lead lines 55-1, 55-2, 55-3, 55-4. A switching matrix 58 is coupled to the set of horizontal selection switches via signal lines 57-1 through 57-4 and signal output lines 59-1 through 59-4 are coupled to the switching matrix 58.

The vertical scanning circuit 51 generates vertical selection signals $\phi_{G1}$–$\phi_{G4}$ on lead lines 53-1–53-4, respectively. The horizontal scanning circuit 52 generates horizontal selection signals $\phi_{S1}$–$\phi_{S4}$ on lead lines 55-1–55-4 respectively. For purposes of illustration, the image input device 50 is configured to provide a 4 by 4 matrix and a 2 by 2 local mask. Output terminals of the NDRO elements 54-11–54-41; 54-12–54-42; 54-13–54-43; 54-14–54-44 are connected alternately to lead lines 57-1–57-4 such that the output terminal of the NDRO element 54-11 is connected to lead line 57-1 through the horizontal selection switch 56-1a and the output terminal of the NDRO element 54-21 is connected to lead line 57-2 through the horizontal selection switch 56-1b and so on. Similarly, the second column of NDRO elements 54-12 through 54-42 are connected to lead lines 57-3 and 57-4, the third column of NDRO elements 54-13 through 54-43 are connected to lead lines 57-1 and 57-2; and the fourth column of NDRO elements 54-14 through 54-44 are connected to lead lines 57-3 and 57-4.

Figure 2:
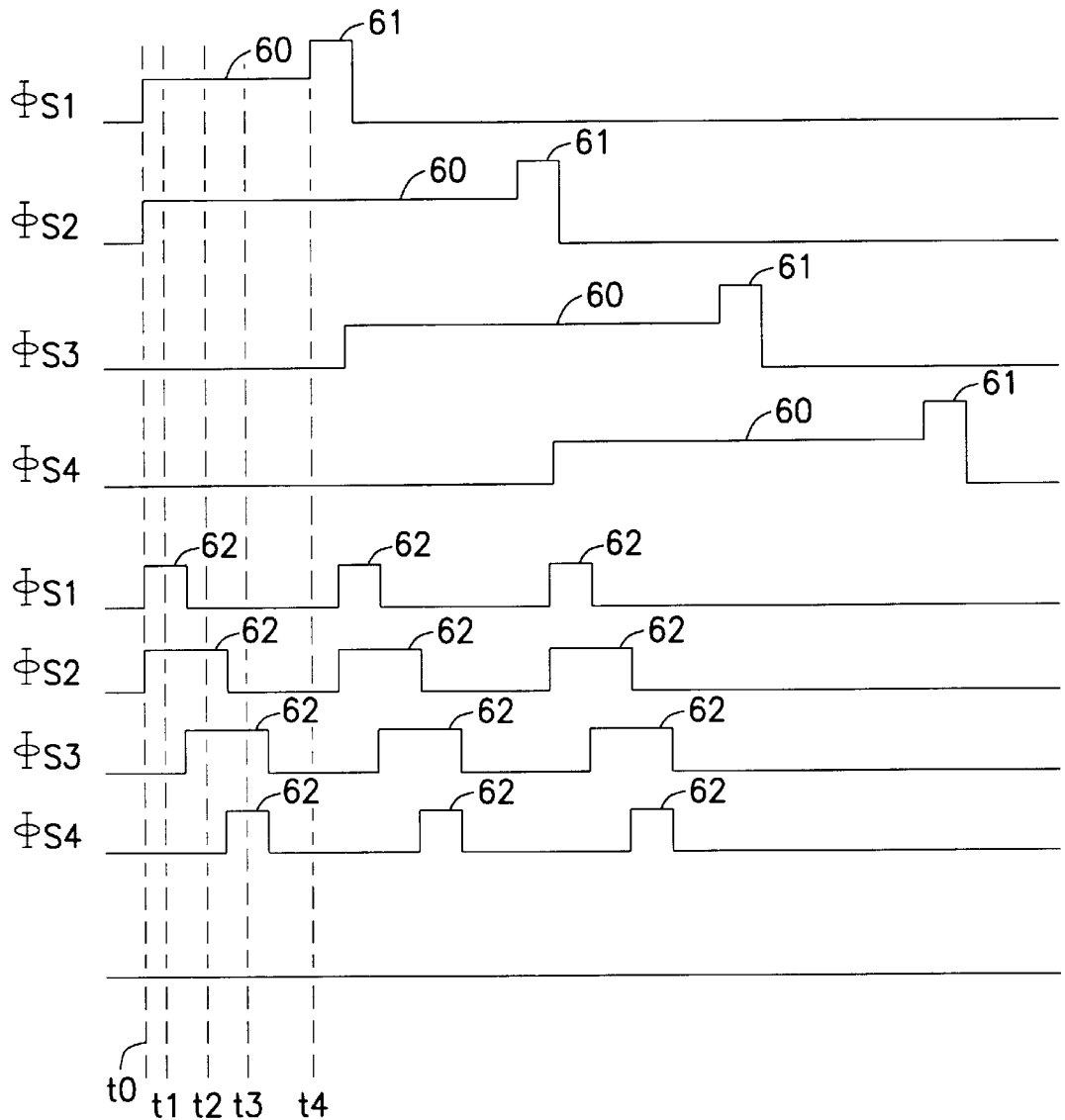
FIG. 2 shows a timing chart of vertical selection signals $\phi_{G1}$–$\phi_{G4}$ and horizontal selection signals $\phi_{S1}$–$\phi_{S4}$ from the prior art circuit of FIG. 1.

The operation of the image input device 50 will be explained with reference to FIG. 2. FIG. 2 is a timing diagram of the vertical selection signals $\phi_{G1}$–$\phi_{G4}$ generated from the vertical scanning circuit 51 and the horizontal selection signals $\phi_{S1}$–$\phi_{S4}$ generated from the horizontal scanning circuit 52. For each vertical selection signal $\phi_{G1}$–$\phi_{G4}$, pulse 60 is a read pulse for reading an electrical quantity (such as voltage or current) modulated by the accumulated charge in a NDRO element 54. Pulse 61 is a reset pulse for releasing an electric charge of the NDRO element 54 and resetting the NDRO element 54 to its initial state. An NDRO element 54 can be repeatedly read until a reset pulse 61 is asserted while a read pulse 60 is being applied to its gate (signal $\phi_{Gi}$ for NDRO elements 54-1i).

While the read pulse 60 and reset pulse 61 are not asserted, the NDRO element will continue to accumulate an electric charge. In this state, the NDRO element is off and signal current does not flow.

Pulse 62 is a horizontal selection pulse which is asserted on horizontal selection switches 56-1a–56-4b to connect the NDRO elements 54-11–54-44 to lead lines 57-1–57-4.

Referring to FIG. 2, the read pulse 60 is asserted on lead lines 53-1, 53-2, from time $t_0$ to $t_4$, to select the first line 53-1 and the second line 53-2. At time $t_1$ the horizontal selection pulse 62 is asserted on lead lines 55-1, 55-2 so that signals are output: to lead line 57-1 from NDRO element 54-11; to lead line 57-2 from NDRO element 54-21; to lead line 57-3 from NDRO element 54-12; and to lead line 57-4 from NDRO element 54-22, respectively. The switching matrix 58 connects the signals applied to lead lines 57 (from the four NDRO elements 54) to signal output lines 59 such that: the signal from NDRO element 54-11 (upper left) is connected to signal output line 59-1, the signal from NDRO element 54-21 (lower left) is connected to signal output line 59-2, the signal from NDRO element 54-12 (upper right) is connected to 59-3, and the signal from NDRO element 54-22 (lower right) is connected to 59-4, respectively.

Therefore, at time $t_1$, lead line 57-1 and signal output line 59-1, lead line 57-2 and signal output line 59-2, lead line 57-3 and signal output line 59-3, and lead line 57-4 and signal output line 59-4, are connected in order to transfer signals from NDRO element 54-11 to signal output lead line 59-1, from NDRO element 54-21 to signal output line 59-2, from NDRO element 54-12 to signal output line 59-3, and from NDRO element 54-22 to signal output line 59-4, respectively.

At time $t_2$, horizontal selection pulse 62 is asserted on lead lines 55-2, 55-3 so that signals from the NDRO elements 54-12, -22, -13, -23 are output to signal output lines 59-1, -2, -3, -4 respectively.

At time $t_3$ horizontal selection pulse 62 is asserted on lead lines 55-3, 55-4 so that signals from the NDRO elements 54-13, -23, -14, -24 are output to signal output lines 59-1, -2, -3, -4 respectively. This completes the first horizontal scanning and NDRO elements 54-11 through 54-24 have been scanned using a 2 by 2 local mask.

At time $t_4$, after completion of the first horizontal scanning, the reset pulse 61 is asserted on lead line 53-1 to reset the first line of NDRO elements 54-11, -12, -13, -14.

A second, third, and fourth horizontal scanning is conducted in the same manner and all NDRO elements in the 4 by 4 matrix have been scanned by the 2 by 2 local mask.

Figure 1:
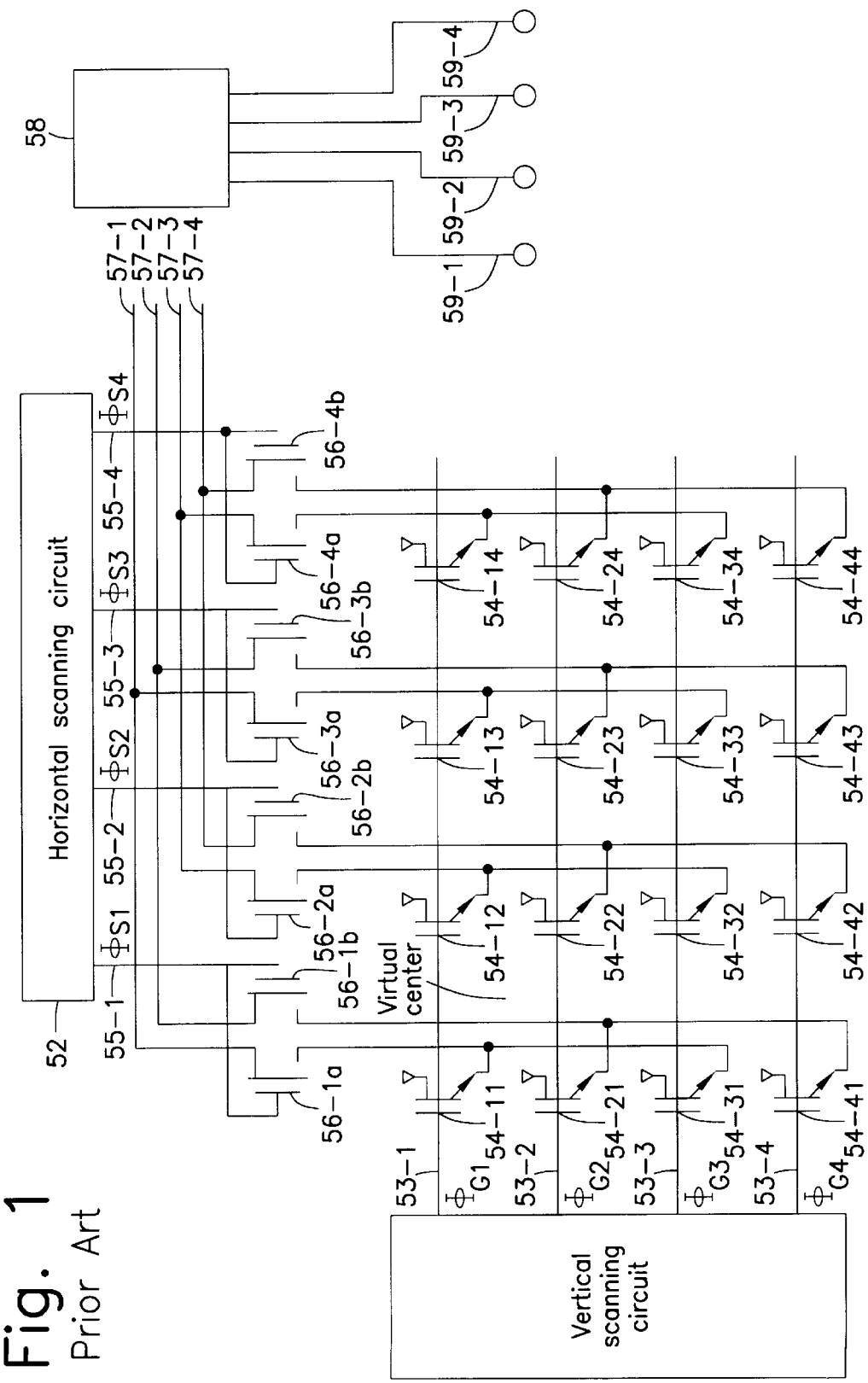
FIG. 1 shows a prior art image input device.

The circuit of FIG. 1 can be used to provide edge detection or image smoothing by manipulation of the data output from the switch matrix. For example, to provide image smoothing, the output of each NDRO element is averaged with the outputs of surrounding NDRO elements to form a smoothed image. To provide an edge detection function, each NDRO element output is compared with an average of some or all of the other NDRO element outputs and a difference D is calculated for each NDRO element. If the difference D changes drastically over a short distance (e.g. the distance from NDRO element 54-11 to NDRO element 54-13), then an edge is detected.

Figure 3A:
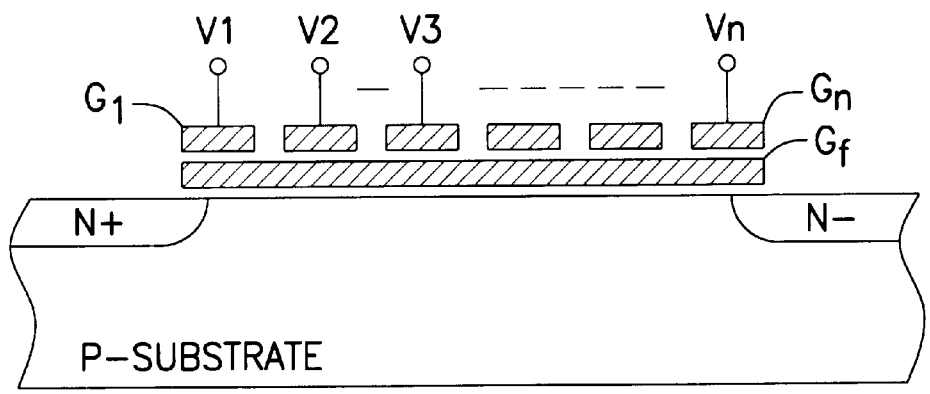
FIG. 3 shows a basic structure of a prior art neuron MOSFET.
Figure 3B:
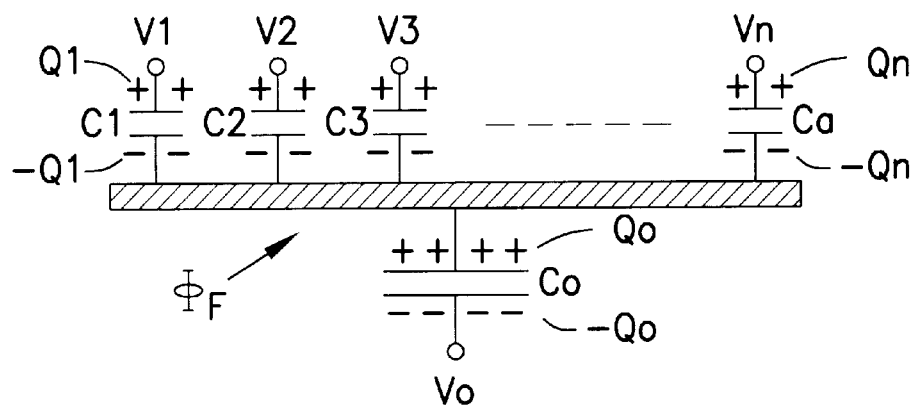

FIG. 3(a) shows the basic structure of a prior art neuron MOSFET and FIG. 3(b) shows a relationship among terminal voltages and capacitive coupling coefficients of the circuit in FIG. 3(a). A neuron MOSFET includes a plurality of input gates $G_1$–$G_n$ which are connected to a floating gate $G_f$. The charge at the floating gate, $Q_F$, is:

$$Q_F = Q_O + \sum_{I=0}^{N}(-Q_i) \text{ where,}$$

$$Q_O = C_O(\phi_F - V_O)$$

$$Q_i = C_i(V_i - \phi_F) \text{ and } V_o \text{ is the p-substrate potential.}$$

The potential of the floating gate $\phi_F$ is determined as $$\phi_F = \frac{Q_F + \sum_{I=0}^{N} C_i V_i}{\sum_{I=0}^{N} C_i}$$

When $V_O = 0$, $Q_F = 0$, $C_{TOT} = \sum_{I=0}^{N} C_i$, then $\phi_F = \frac{\sum_{I=0}^{N} C_i V_i}{C_{TOT}}$ $\phi_F$ is the weighted average of all the input signals at $G_1$–$G_n$. When $\phi_F$ is larger than the threshold voltage $V_{th}$, the neuron MOSFET turns "on."

According to a first embodiment of the present invention, a variable threshold two valued output image sensor is provided.

In order to obtain a two-valued (binary) image of a normal (e.g. color) image, the normal image, via the amount of light absorbed by a corresponding photodiode, is compared to a threshold value to determine the existence ("1") or absence ("0") of an object.

Figure 4A:
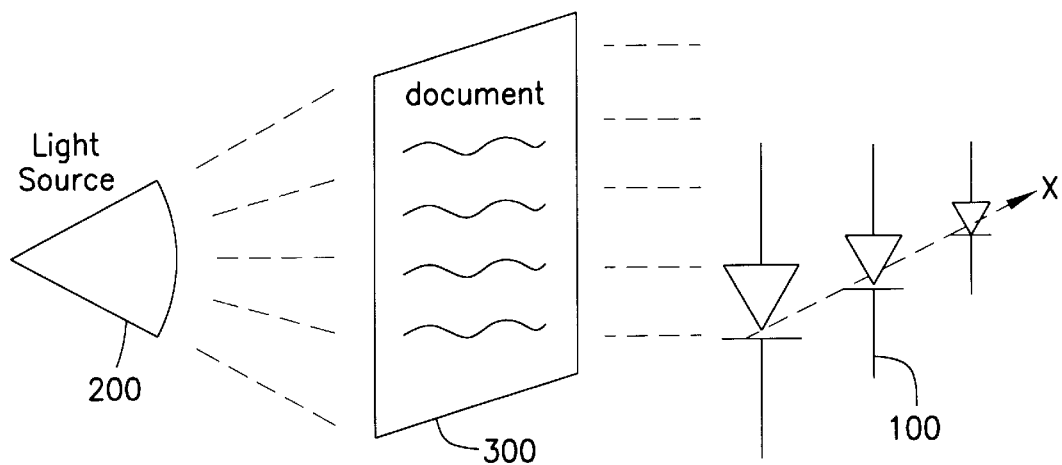
FIG. 4(a) illustrates the manner in which an image of a document is recorded in a photodiode.
Figure 4B:
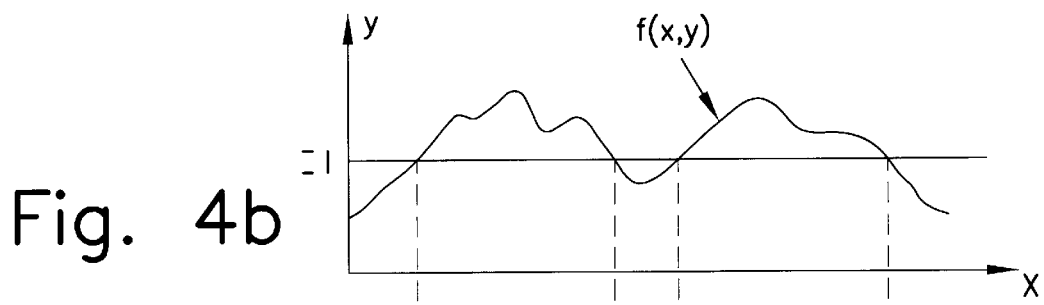
FIG. 4(b) shows the charge of a photodiode array (f(x)) contrasted with a threshold (t).
Figure 4C:
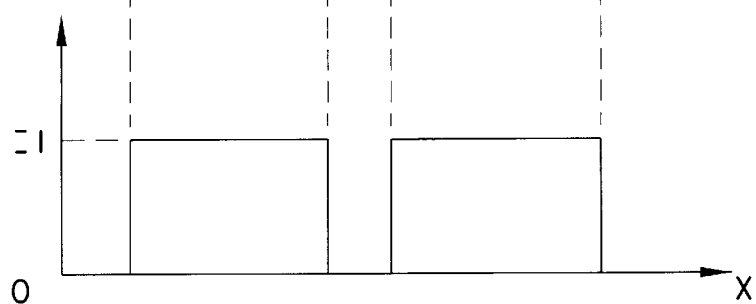
FIG. 4(c) shows a two valued output for f(x) of FIG. 4(b).
Figures 5, 18:
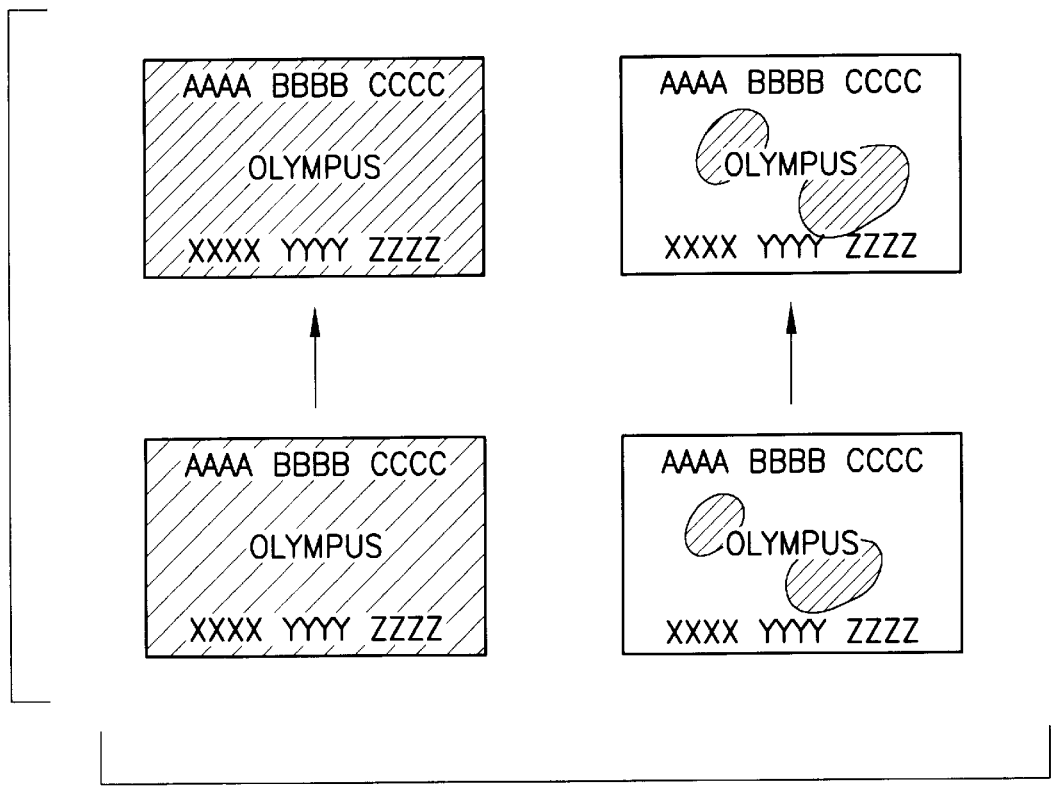
FIG. 5 illustrates the original images with uniform background and stains/shading and their reproduced images by a conventional method.
FIG. 18 illustrates the weights applied to input gates of neuron MOSFETs in the neuron MOSFET array of FIG. 17.

Referring to FIGS. 4(a)(b), the function f(x) represents, for example, the charge (Y) absorbed by a photodiode 100 exposed to a light source 200, where an object 300 is positioned between the light source 200 and the photodiode array 100. Normally, a single, static threshold "t" is provided. If the photodiode 100 is charged to a value above "t", a binary "1" is recorded. The disadvantage of such a system is that not all images have a similar background level. It is therefore known in the art to determine the threshold value from a histogram which is generated from analog to digital converted data ($2^n$ bit) stored in memory. The analog charge of each photodiode is digitized and stored in memory. A histogram is compiled which indicates, for each of a plurality of possible digitized charges, the number of photodiodes which contained such a charge. There are several algorithms which can be used to determine the threshold value by using such a histogram. However, such techniques are ineffective where different portions of a document have different shading, as illustrated in FIG. 5 (right), because the threshold value is fixed over an entire document. In such a case, conventional techniques derive local thresholds in the manner discussed above in order to compensate for this type of shading. The disadvantage of both prior art techniques is that the threshold must be calculated after the image is A/D converted.

Figure 6:
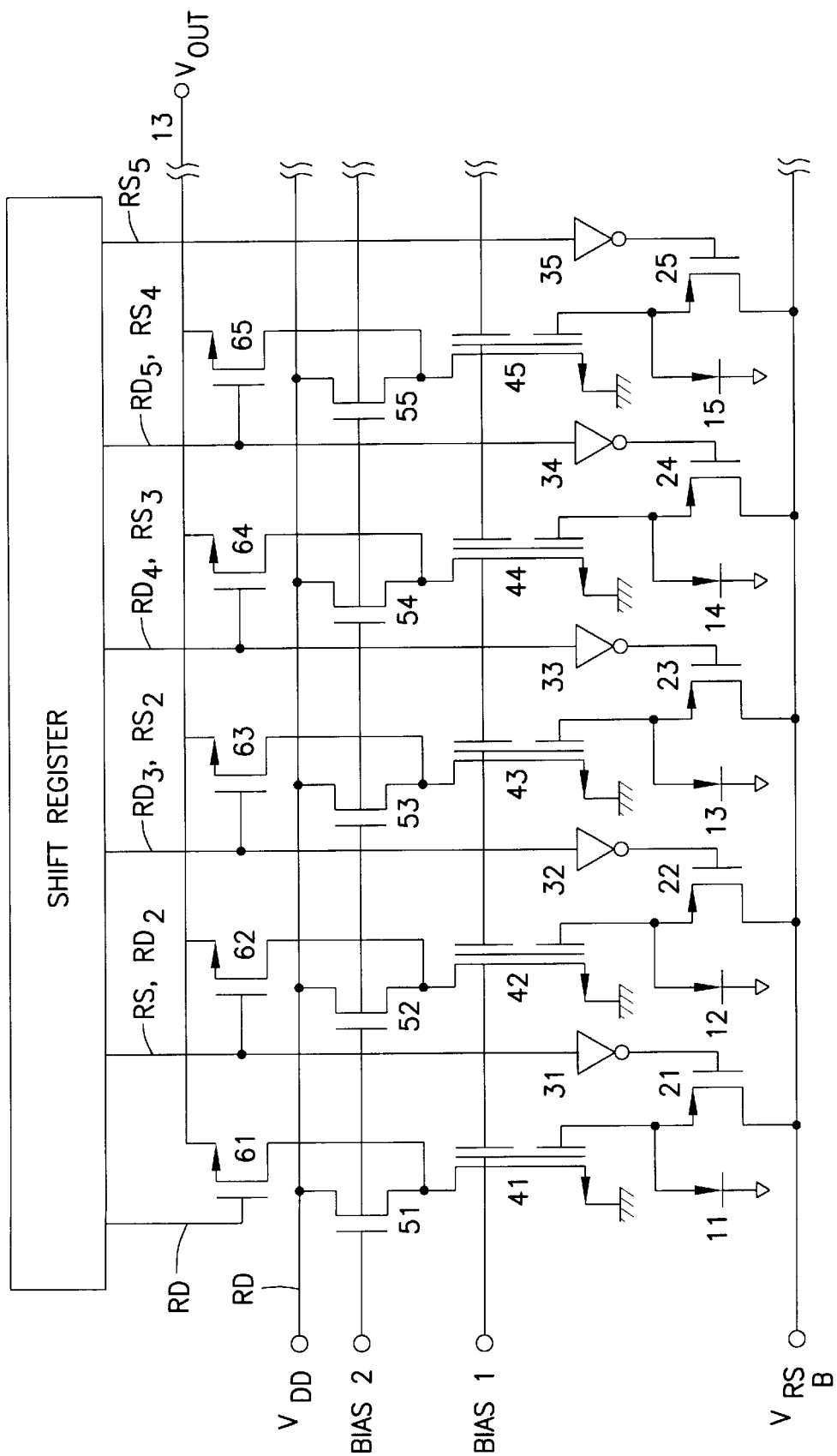
FIG. 6 shows a variable threshold two valued output image sensor according to a first Embodiment of the present invention.

In accordance with the variable threshold two valued image sensor of the present invention, the above drawbacks of the prior art are eliminated by providing a circuit which determines the threshold value in real time using a BIAS generator which repeatedly alters the threshold based upon the amplitude of the output signal. Referring to FIG. 6, a plurality of photodiodes 1 (1-1, 1-2, 1-3 . . . ) are disposed in an array. An anode of each photodiode 1 is connected to a source of a respective p-MOSFET 2 (2-1, - - - 2-5), which functions as a reset transistor, and to a first input gate of a respective neuron MOSFET 4 (4-1 - - - 4-5). A drain of each p-MOSFET 2 is connected to a reset voltage $V_{RS}$. A cathode of each photodiode 1 is connected to positive power supply 7. A source of each neuron MOSFET 4 is connected to ground. A second input gate of each neuron MOSFET 4 is connected to BIAS1. A drain of each neuron MOSFET 4 is connected to a respective drain of a load transistor (p-MOSFET 5) and to a drain of a plurality of switches (selection transistors 6-1 - - - 6-5). A source of each selection transistor 6 is connected to an output line $V_{OUT}$. A positive voltage $V_{DD}$ is supplied to a source of each p-MOSFET 5. A gate of each p-MOSFET 5 is connected to BIAS2. BIAS2 is set at a voltage sufficient to insure that the p-MOSFET 5 will act as an active load. $V_{DD}$, p-MOSFET 5, and neuron MOSFET 4 form an invertor. A gate of each selection transistor 6 is connected to shift register 12 and to the gate of each reset transistor 2 via invertor 3.

The shift register 12 has 5 outputs $RD_1$, $RD_2RS_1$, $RD_3RS_2$, $RD_4RS_3$, $RD_5RS_4$, $RS_5$) and operates to sequentially generate a positive pulse at each output such that a positive pulse never appears at two outputs simultaneously. When $RD_1$ is asserted, the output of neuron MOSFET 4-1, which, as explained below, is a function of the charge stored at photodiode 1-1 and the signal BIAS1, appears on output line $V_{out}$. When $RD_2RS_1$ is asserted, the output of neuron MOSFET 4-2 is applied to $V_{out}$. Moreover, since a reset pulse (in this case $RD_2RS_1$) is applied to the gate of p-MOSFET 2-1, photodiode 1-1 will be reset. When the photodiode (1-1) is reset, the accumulated charge is dissipated and the photodiode voltage is set at the initial value of $V_{RS}$. In contrast, when a photodiode is "read", the accumulated charge is unaltered. When $RD_3RS_2$ is asserted, neuron MOSFET 4-3 is read and photodiode 1-2 is reset. When $RD_4RS_3$ is asserted, neuron MOSFET 4-4 is read and photodiode 1-3 is reset and so on.

Figure 7A:
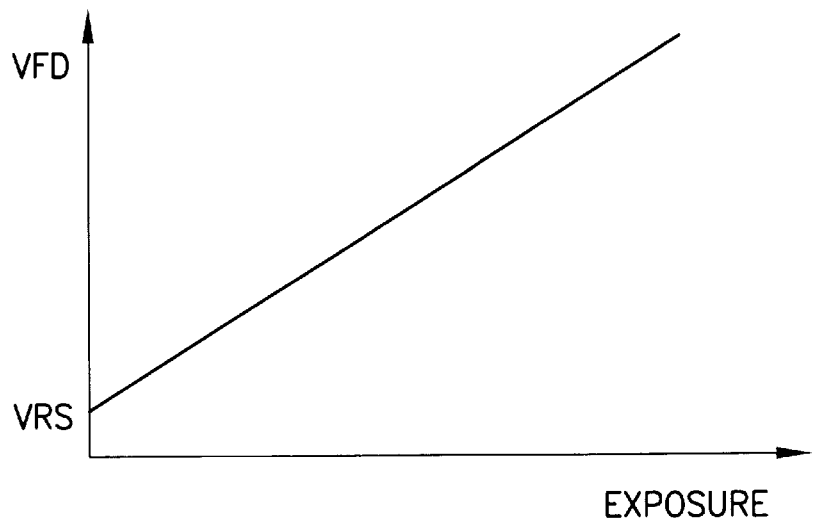
FIG. 7 shows a graph of photodiode voltage $V_{PD}$ vs. Exposure and a graph of $V_{out}$ vs. Exposure.
Figure 7B:
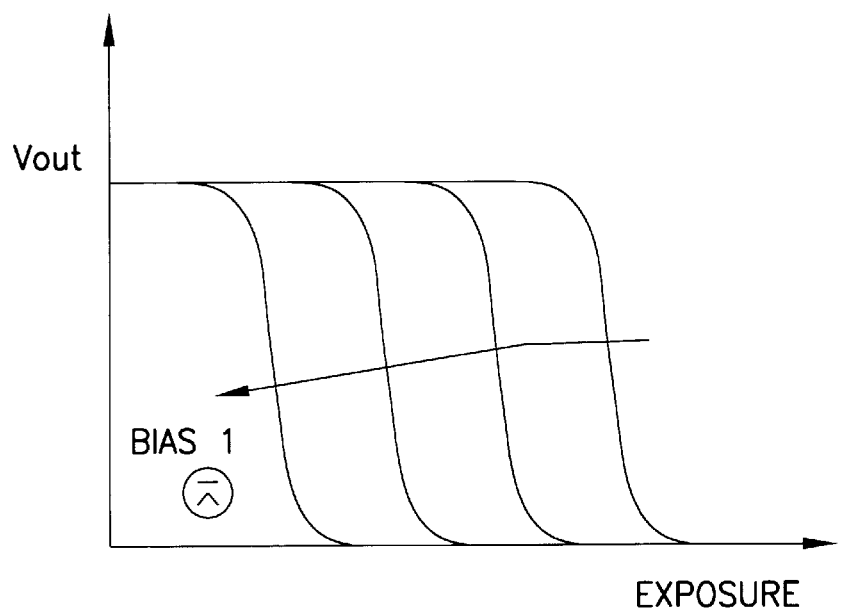

As illustrated in FIG. 7, by varying the value of BIAS1, the threshold at which the neuron MOSFETs 4 will switch on/off can be varied thereby providing a variable threshold two valued image sensor. A BIAS generator (not shown) can be used to monitor the signal $V_{out}$ and generate the bias voltage BIAS1 so that the desired threshold of exposure is set. As BIAS1 increases, the threshold of the neuron MOSFETs is lowered and shading of an image is compensated for. The BIAS generator is explained more fully below with regard to FIG. 14.

Figure 8:
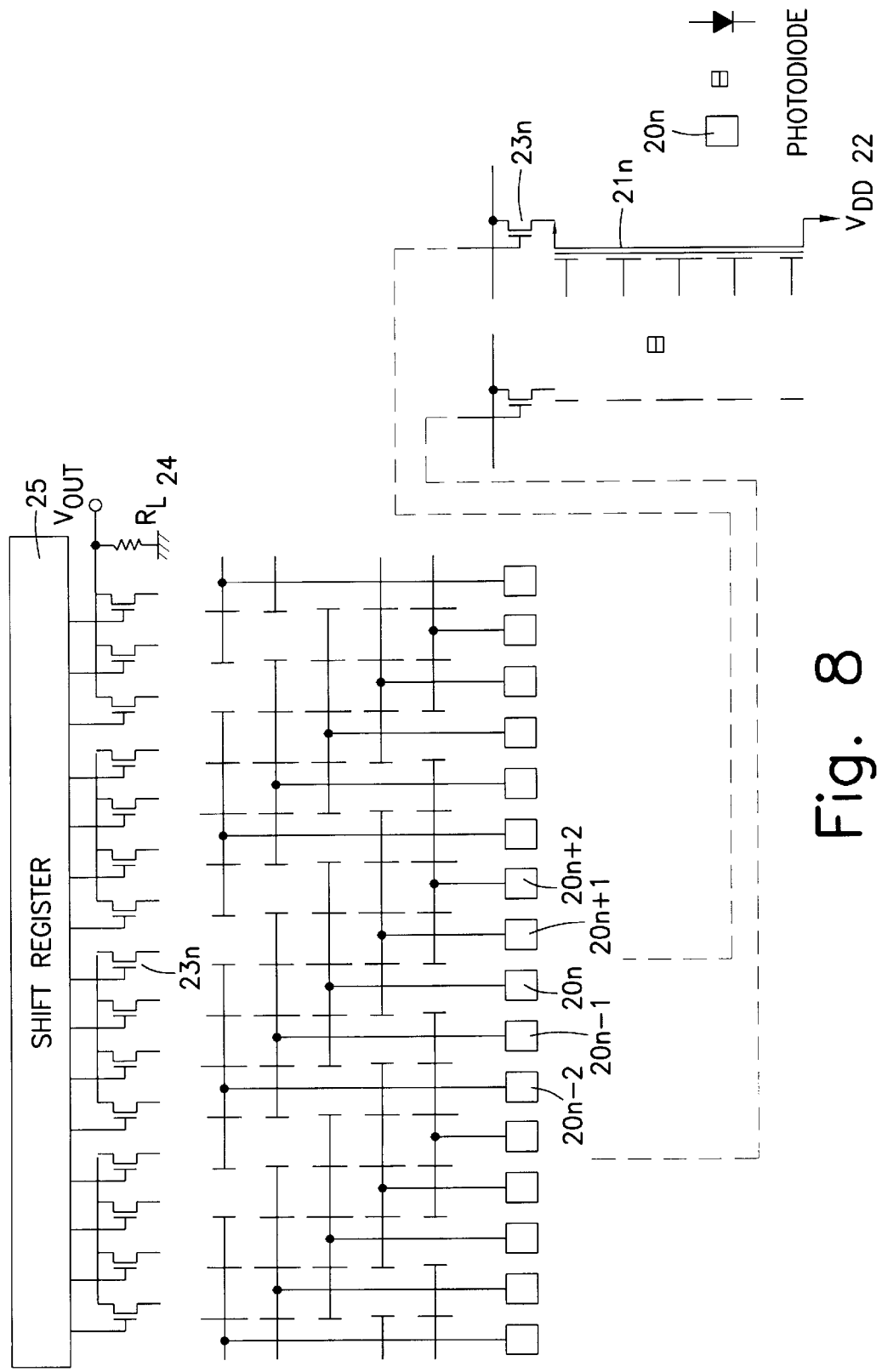
FIG. 8 shows a smoothed output image sensor according to a second embodiment of the present invention.

FIG. 8 shows a smoothed output image sensor according to the present invention. Smoothed output image sensors are used to provide a smooth, or noise free, image. This can be accomplished by filtering the data using, e.g., a gaussian filter. For example, a prior art smoothed output image sensor can be implemented using the circuit of FIG. 1. Once the NDRO element values are read through the switching matrix 58 into off-chip hardware (not shown), they can be manipulated to produce a smoothed output.

In order to obtain a smoothed output value, one could take a weighted average of the values from NDRO elements 54-11, -12, -21, -22, as the smoothed value for a virtual center element of those four NDRO elements. The weights chosen and the number of NDRO elements used to obtain the weighted average will determine the characteristics of the filter. One drawback of this prior art method is that it requires off-chip hardware including multipliers and adders to calculate the weighted average. This type of preprocessing invariably makes such a method unduly expensive.

In accordance with the smoothed output image sensor of the present invention, a smoothed output is provided directly from the image sensor thereby reducing the off-chip hardware required by the prior art. In accordance with the present invention, neuron MOSFETs are used to provide a smoothed output contemporaneously with the reading of each photodiode. Referring to FIG. 8, for a photodiode $20_n$, a neuron MOSFET $21_n$ is provided with gate inputs coupled to photodiodes $21_{n-2}$ through $21_{n+2}$. As will be explained more fully below, the output of the neuron MOSFET $21_n$ provides a smoothed output corresponding to photodiode $20_n$ which comprises an weighted average of the outputs of photodiodes $20_{n-2}$ to $20_{n+2}$.

Figure 9A:
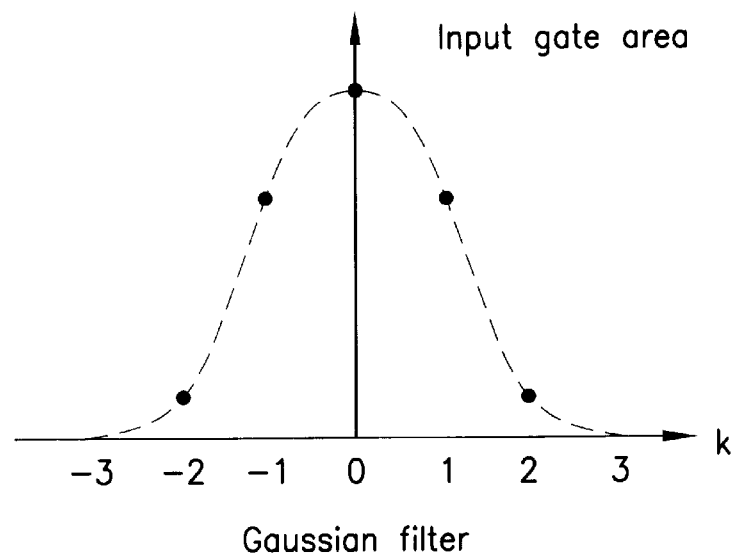
FIG. 9 shows a ratio of input gate areas for a gaussian and a rectangular filter.
Figure 9B:
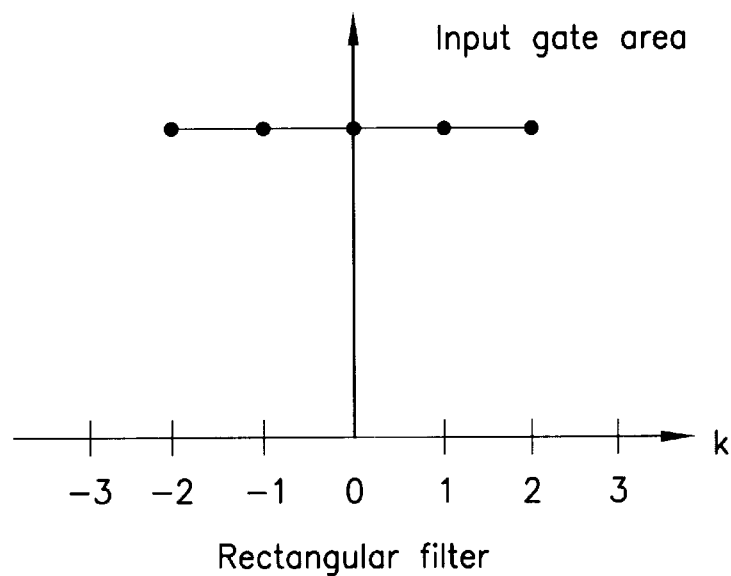

A plurality of photodiodes $20_n$ are arranged in an array. Photodiodes $20_n$ are reset by reset transistors (not shown) when the reset pulse is asserted as described with respect to FIG. 6. An equal number of photodiodes $20_n$ and neuron MOSFETs $21_n$ are provided. Each neuron MOSFET $21_n$ has 5 inputs. For neuron MOSFET $21_n$, one of the gates is connected to a photodiode $20_n$, and the other 4 gates are connected to photodiodes $20_{n-2}, 20_{n-1}, 20_{n+1}, 20_{n+2}$, respectively as shown in FIG. 8. The area of each input gate is chosen to provide the desired filter characteristics for smoothing. For example, to obtain a gaussian filter, the ratio of input gate areas is determined as shown in FIG. 9(a). For a rectangular filter characteristic, the ratio of input gate areas is determined as shown in FIG. 9(b). FIG. 8 shows neuron MOSFETs 21 having gaussian filter characteristics.

A drain of the neuron MOSFET $21_n$ is connected to positive voltage $V_{DD}$ 22. A source of the neuron MOSFET $21_n$ is connected to a drain of a selection switch $23_n$. A source of the selection switch $23_n$ is connected to a load resistance $R_L$ 24 via video line, $V_{OUT}$. The other end of $R_L$ 24 is grounded. Each gate of selection switch $23_n$ is connected to a shift register 25. Each neuron MOSFET $21_n$ forms a source follower with the resistance $R_L$ 24 via the selection switch $23_n$. When the selection switch $23_n$ is turned on by asserting a pulse from the shift register 25, the output voltage $<V_{out}>$ is given by $$<V_{OUT}> = A_V*(\phi(n) - V_{TH}*) \qquad (1)$$

where $A_V*$, $V_{TH}*$, $\phi(n)$ are voltage gain and threshold voltage of the source follower and the floating gate potential of the neuron MOSFET $21_n$ respectively.

The potential $\phi(n)$ on floating gate o the neuron MOSFET $21_n$ is:

$$\phi(n) = \sum_{k=-2}^{k=2} h(k) V_{PD}(n+k) \qquad (2)$$

where h(k) is the response function of the filter which is proportional to the input gate area illustrated in FIG. 9, and $V_{PD}(n)$ is the voltage of photodiode at position n.

Referring to FIG. 8, the shift register 25 switches on each selection switch $23_n$, consecutively, and the smoothed output defined in equations (1) and (2) corresponding to each photodiode $20_n$ appears at $V_{OUT}$.

Figure 10:
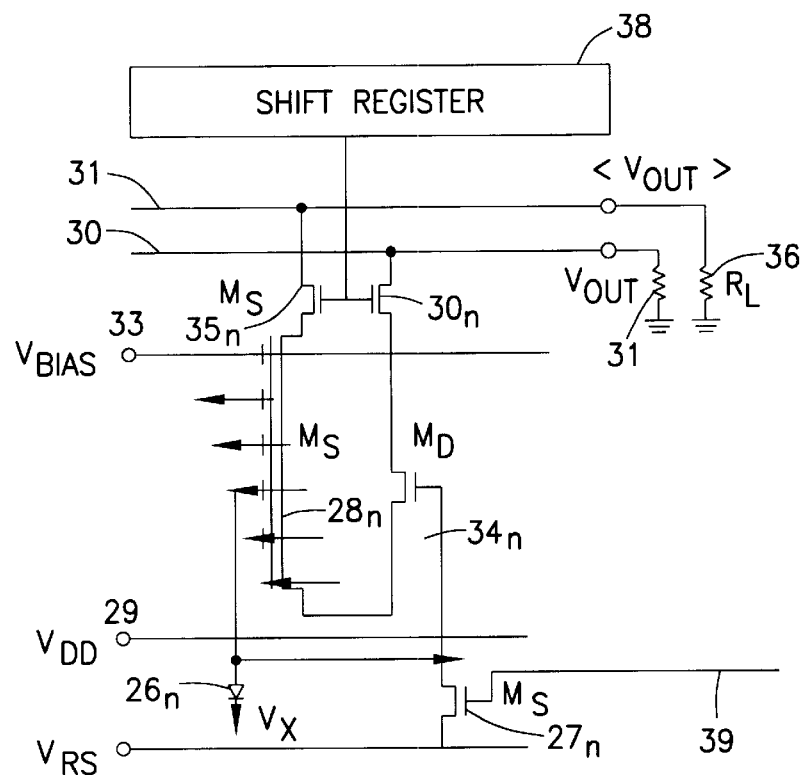
FIG. 10 shows a portion of a circuit having an edge detecting function according to a third embodiment of the present invention.

FIG. 10 shows a portion of a circuit which provides a edge detecting function of an input image according to the present invention. While FIG. 10 shows only a single photodiode, a single neuron MOSFET, etc., it should be understood that the full circuit includes an array of "n" photodiodes, "n" neuron MOSFETs, etc. In accordance with the circuit of FIG. 10, a smoothed output $<V_{out}>$ for a photodiode $26_n$ is provided by neuron MOSFET $28_n$ in essentially the same manner as in FIG. 8. In addition, an n-MOSFET $34_n$ provides a conventional fixed threshold pixel output $V_{out}$. An edge is detected at the point at which $V_{out} - <V_{out}>$ changes rapidly over a short distance (e.g. two or three photodiodes).

The circuit is constructed as follows. An anode of photodiode $26_n$ is connected to: a source of p-MOSFET $27_n$; a gate of a MOSFET $34_n$; and one of six input gates of a neuron MOSFET $28_n$.

A drain of p-MOSFET $27_n$ is connected to $V_{RS}$ and the gate of pMOSFET $27_n$ is coupled to a reset pulse terminal 39. When a pulse is applied on line 39, photodiode $26_n$ is reset.

A cathode of photodiode $26_n$ is connected to a positive voltage supply $V_K$. A drain of the neuron MOSFET $28_n$ is connected to positive voltage $V_{DD}$ 29 and a drain of the MOSFET $34_n$. A source of MOSFET $34_n$ is connected to a drain of a selection switch $30_n$. A source of the selection switch $30_n$ is connected to a load resistance $R_L$ 31 via line 32. The other end of $R_L$ 31 is grounded. A source of the neuron MOSFET $28_n$ is connected to a drain of a selection switch $35_n$. A source of the selection switch $35_n$ is connected to a load resistance $R_L$ 36 via line 37. The other end of $R_L$ 36 is grounded. Each gate of the selection switches $30_n, 35_n$ is connected to the shift register 38.

Four of the remaining input gates of neuron MOSFET $28_n$ are connected to surrounding photodiodes (not shown) in the same manner as FIG. 8. The remaining input gate of neuron MOSFET $28_n$ is connected to BIAS 33.

The neuron MOSFET $28_n$ and the load resistance 36 form a source follower through the selection switch $35_n$. In addition, the MOSFET $34_n$ and the load resistance 31 form a source follower through the selection switch $30_n$. VDD 29 works as a drain voltage and VBIAS 33 works as threshold value control bias as discussed above with regard to FIG. 6.

The smoothed output $<V_{OUT}>$ and the pixel output $V_{OUT}$ is represented as follows:

$$<V_{OUT}> = A_V*(\phi_F - V_{TH}*) \qquad (3)$$

$$V_{OUT} = A_V(V_{PD} - V_{TH}) \qquad (4)$$

where $A_V$ is a voltage gain of the source follower formed by the MOSFET $34_n$ and a load resistor $R_L$ via the selection switch $30_n$ and $V_{TH}$ is a threshold voltage of the source follower.

Figure 11:
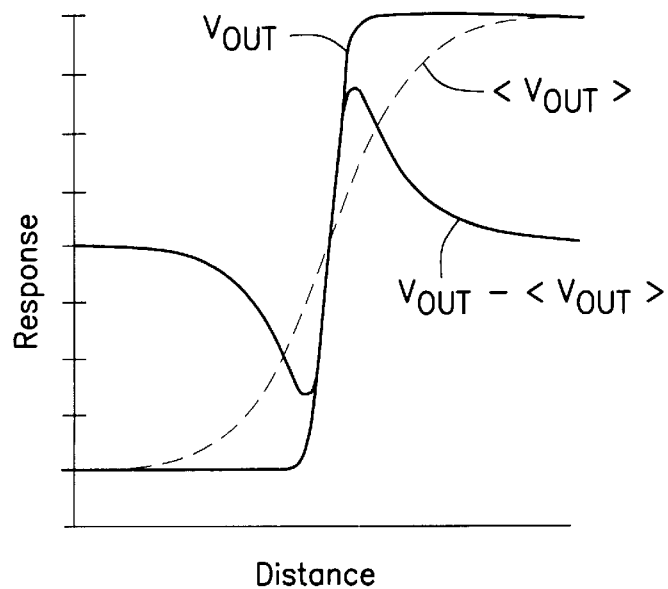
FIG. 11 shows the manner in which an edge is identified from the circuit of FIG. 10.

FIG. 11 illustrates the manner in which the circuit of FIG. 10 detects an edge. As shown in FIG. 11, $V_{OUT} - <V_{OUT}>$ changes steeply at an edge of an image. Edge detection of an image is therefore provided by monitoring the $V_{out} - <V_{out}>$ and declaring an edge when $V_{out} - <V_{out}>$ changes steeply over a short distance. It is preferable to set $A_V* = A_V$, $V_{TH} = V_{TH}*$ because differences between $A_V*$ and $A_V$, or $V_{TH}$ and $V_{TH}*$ will cause the characteristics of the source followers for $V_{out}$ and $<V_{out}>$ to be unbalanced thereby degrading the accuracy of the edge detection.

Figure 12:
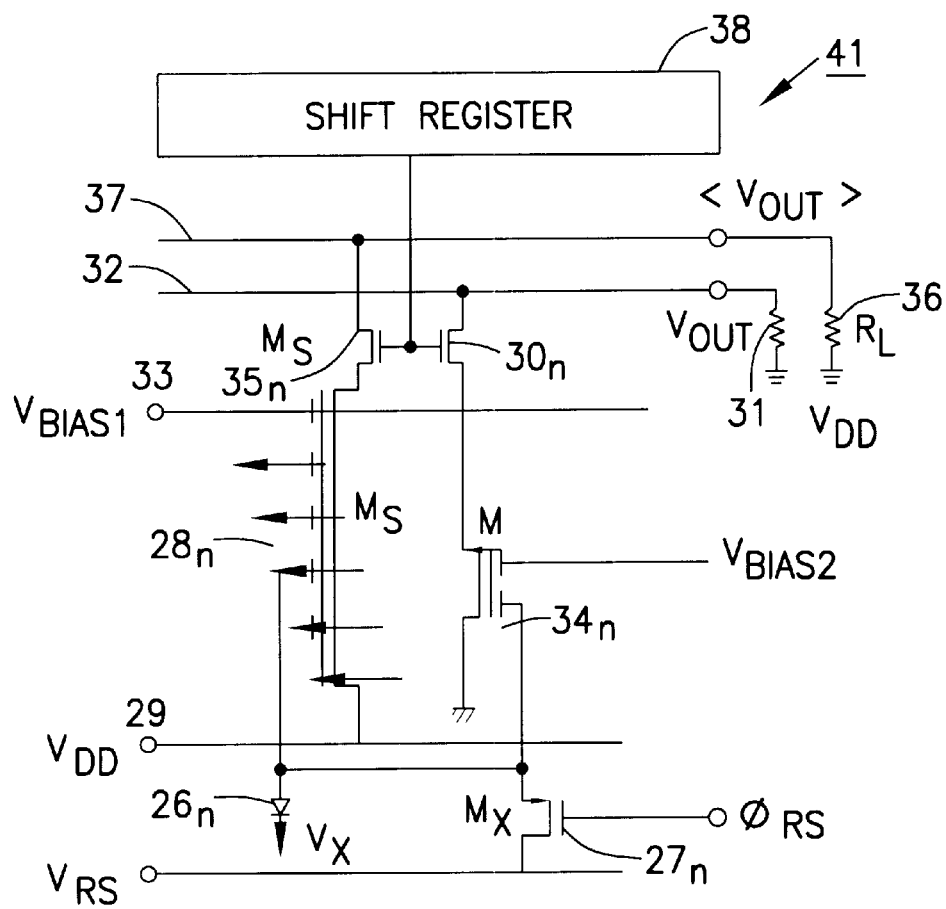
FIG. 12 shows a variable threshold two valued output image sensor according to a fourth embodiment of the present invention.
Figure 13:
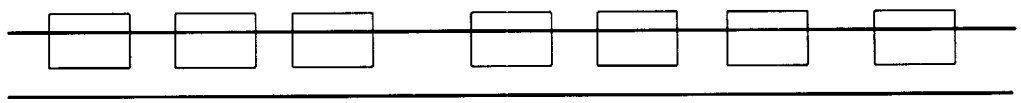
FIG. 13 shows shading of an image background.

FIG. 12 shows a variable threshold two valued output image sensor 41 which provides a smoothed output. This smoothed output is used to monitor he shading or stains of the image background as shown in FIG. 13. The configuration of the sensor is the same as the sensor shown in FIG. 10 except that $M_D$ ($34_n$) in FIG. 10 is replaced with a neuron MOSFET $40_n$ having two floating gates. The source of MOSFET $40_n$ is grounded and one end of resistance 31 is connected to $V_{DD}$. One of the input gates is connected to $V_{BIAS2}$ and the other input gate is connected to an anode of photodiode $26_n$ and a source of p-MOSFET $27_n$. A source of the neuron MOSFET $40_n$ is grounded and a drain of the neuron MOSFET $40_n$ is connected to a source of a selection switch $30_n$. A drain of a selection switch $30_n$ is connected to load resistor $R_L$. The load resistance 31 is connected to $V_{DD}$ to form an invertor. $V_{BIAS}$ is renamed $V_{BIAS1}$. A reset pulse, $\phi_{RS}$, provides a reset pulse to the gate of the reset transistor MR $27_n$. As explained previously with reference to FIG. 6, by varying $V_{BIAS2}$, the threshold at which the charge in a particular photodiode 26 turns the neuron MOSFET $40_n$ "on" can be adjusted in accordance with the local shading of the image.

Figure 14:
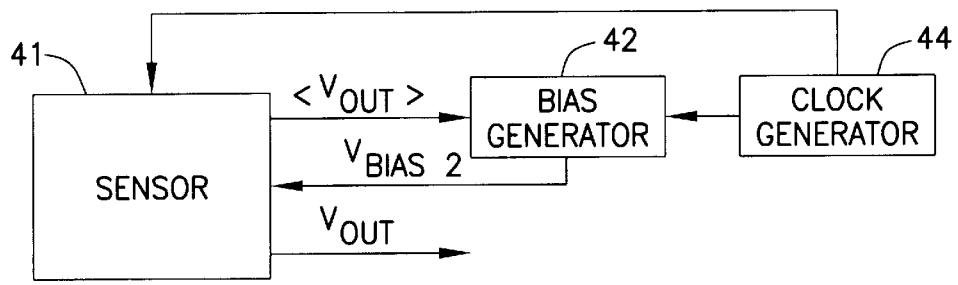
FIG. 14 shows a system having a sensor 41.
Figure 15:
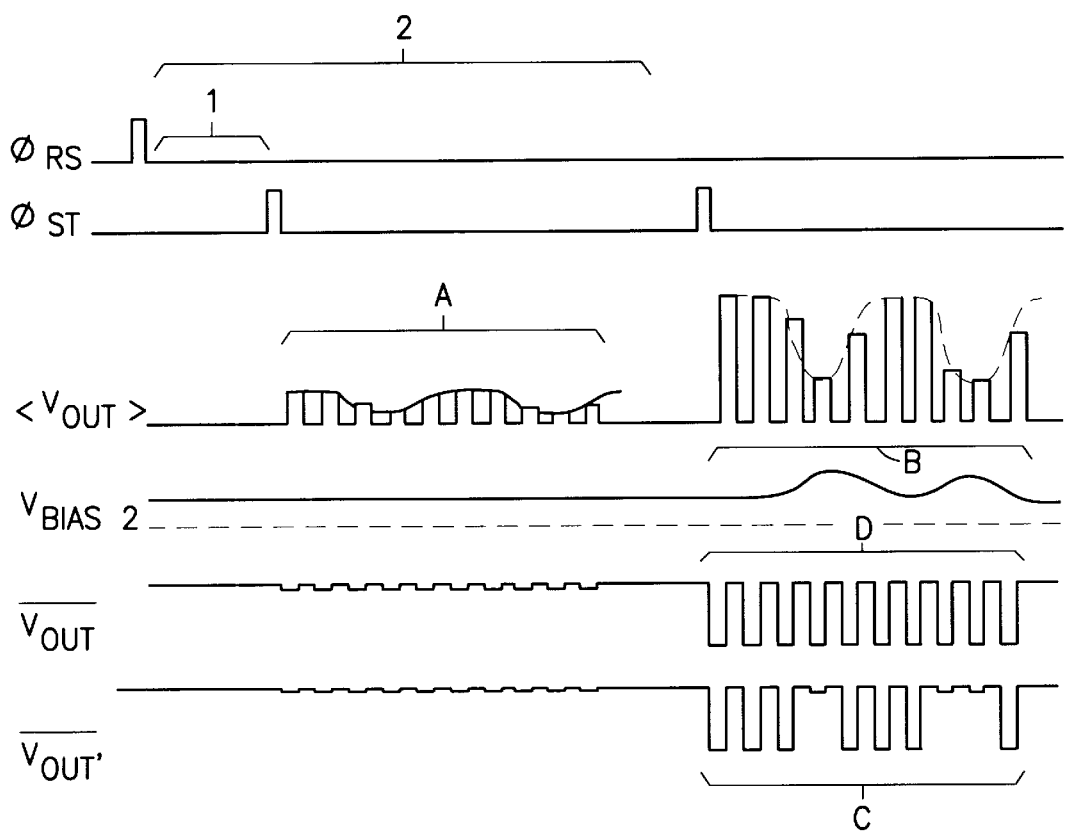
FIG. 15 shows a timing chart of pulse signals $\phi_{RS}$, $\phi_{ST}$, <$V_{out}$>, $V_{BIAS2}$, $\underline{V}_{OUT}$, and $\underline{V}_{OUT}'$.

FIG. 14 shows a system incorporating the sensor 41 of FIG. 12 and FIG. 15 shows a timing chart of pulse signals $\phi_{RS}$, $\phi_{ST}$, $<V_{OUT}>$, $V_{BIAS2}$, $V_{OUT}$, and $V_{OUT}'$ of the system of FIG. 14. The system comprises the sensor 41, a bias generator 42, and a clock generator 44. The bias generator 42 outputs $V_{BIAS2}$ to the sensor 41 and accepts $<V_{OUT}>$ as an input from the sensor 41. Pixel data is output at $V_{out}$.

Operation of the system is as follows. A reset pulse $\phi_{RS}$ is applied to the reset transistor 27 from the clock generator 44 to reset photodiode 26. After sufficient time has past for a charge to accumulate at the photodiode 26 (integration time (1)), $\phi_{ST}$ is applied to the shift register 38 from the clock generator 44 to sequentially provide a selection pulse to each of the selection switches 30, 35. As a result, the smoothed output "A" in FIG. 15 appears at $<V_{OUT}>$. Assuming the characters on the document are uniformly distributed, the smoothed output will show a constant value when there is no shading or stains on the document. The bias generator 42 detects any decrease in output signal $<V_{OUT}>$ at "A". Then, after the integration time (2), $\phi_{ST}$ is again applied to the shift register 38 from the cloak generator 44 and a $V_{BIAS2}$ signal is generated which is a mirror image of the envelope of the output $V_{OUT}$ (as shown in "B" of FIG. 15). Thus, the value of $V_{BIAS2}$ which is added to the input gate of the neuron MOSFET 40 is increased and the threshold value for exposure is decreased in order to correct the decrease of the photodiode potential due to a stain or shading of the image. In FIG. 15, $V_{OUT}$ (D) is a corrected output and $V_{OUT}'$ (C) is an uncorrected output ($V_{BIAS2}$ is not generated).

In accordance with the circuit of FIG. 14, BIAS Generator 42 operates in a feedback loop. BIAS Generator 42 first reads $<V_{out}>$ at "A" in order to generate $V_{BIAS2}$ at "B". Therefore, in accordance with the present invention, the sensors in FIGS. 6, 8, 10, and 12 may be non-destructive readable sensors (which can be accessed repeatedly while maintaining an accumulated charge) rather than normal CCD image sensors (which are reset whenever a signal is accessed). By using NDRO sensors, the total integration time is reduced because the photodiode does not need to recharge after the first $\phi_{ST}$ in FIG. 15. Therefore, the total integration time (2) is shortened.

FIG. 16(a) shows an area image sensor which provides an edge detection function for an image. The sensor includes a vertical scanning circuit 45 including M select lines, a horizontal scanning circuit 46 including N select lines, a pixel array 61 including NDRO elements $61_{i,j}$, a switch array-A 48, a neuron MOSFET array 28, and a switch array-B 29.

The pixel array consists of M×N pixels. Each NDRO element $61_{i,j}$ is connected to a vertical select line 60, which carries vertical select pulse $\phi_{v,i}$ (I=1→M), and to the vertical signal line (62, 63, 64). In order to perform a 3 by 3 local mask operation at each neuron MOSFET, the NDRO elements on a column, $61_{i,j}$(j=1→N), are accessed three times by the vertical scanner 45 in the same manner shown in prior art FIGS. 1 and 2. Therefore, the NDRO element must have nondestructive readout capability. Each NDRO element produces a voltage signal corresponding to the exposure at its load capacitor. Each vertical signal lines, $62_j$, $63_j$ and $64_j$ (j=1→N), is connected to the output nodes of alternating NDRO elements as shown in FIG. 16(a).

The vertical signal lines $62_j$, $63_j$ and $64_j$ are connected to the switch array-A 48 where they are selectively coupled to lines $65_j$, $66_j$, and $67_j$ which, in turn, are fed to the neuron MOSFET array 28 in parallel.

The neuron MOSFET array 28 performs a 3 by 3 local mask operation to provide image smoothing as described below. The neuron MOSFET array 28 outputs a pixel output $68_j$ and a smoothed output $69_j$ to the switch array-B 29 in parallel.

The switch array-B 29 outputs a pixel output 71 and a smoothed output 72 in response to the application of horizontal select pulses $70_j$ from the horizontal scanning circuit 46. The switch array-B acts as multiplexer (e.g., a parallel-to-serial converter). These two output signals are used to provide edge detection for an image in the manner shown in FIG. 11.

The horizontal scanner 46 is driven by the application of a start pulse $\phi_{HST}$. Upon application of $\phi_{HST}$, a pulse will successively appear at each output $70_j$ of the shift register.

Figure 16B:
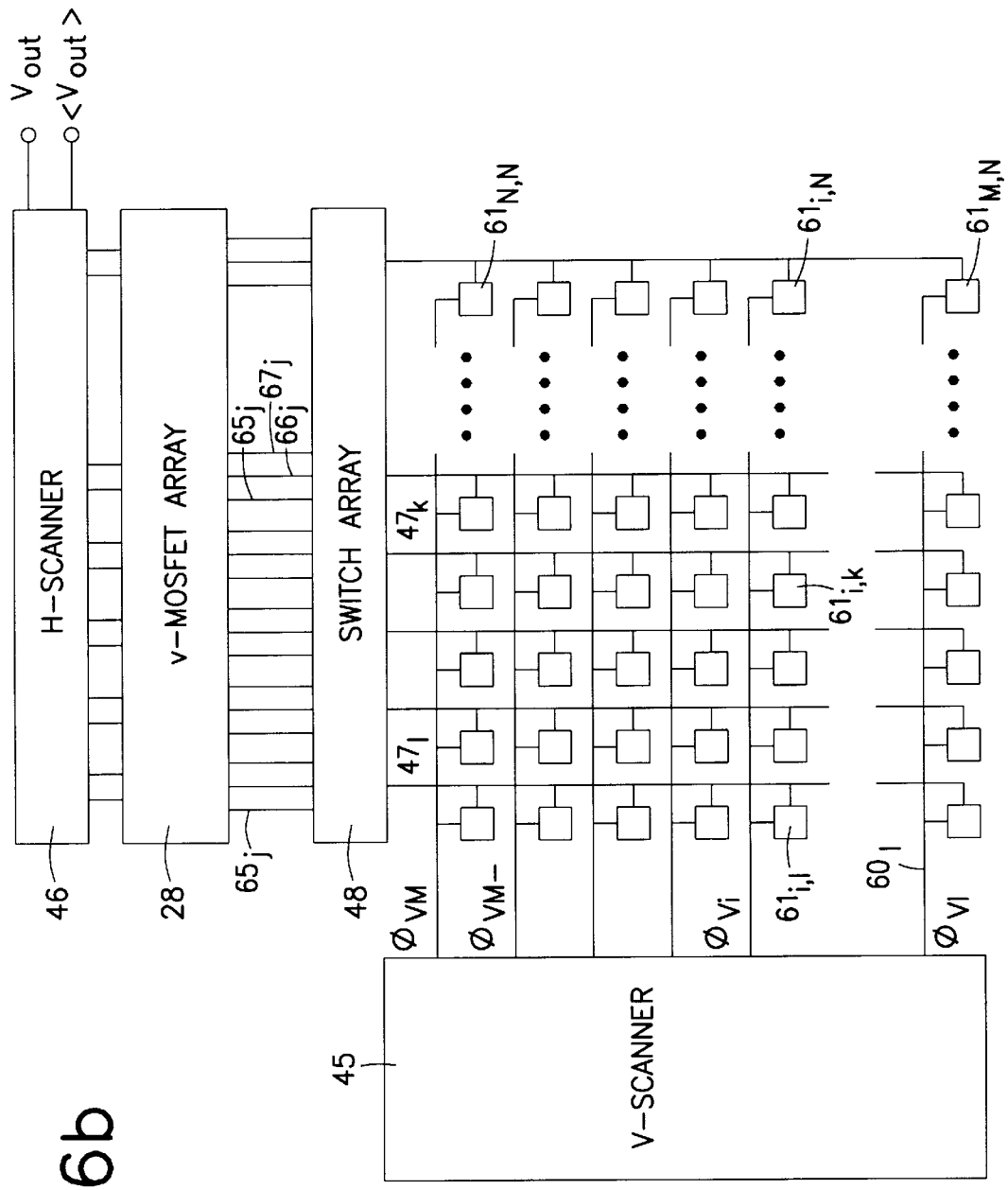
FIG. 16(b) shows a variation of the image sensor according to a fifth embodiment of the present invention.

FIG. 16(b) shows another area image sensor which also provides an edge detection function for an image. As in FIG. 16(a), the sensor includes a vertical scanning circuit 45 including M select lines, a horizontal scanner 46, a pixel array 61 including NDRO elements $61_{i,k}$(i=1→M, k=1→N), a switch array 48, and a neuron MOSFET array 28. As a variation of the image sensor illustrated in FIG. 16(a), the horizontal scanning circuit 46 in FIG. 16(b) incorporates switch array-B for parallel-to-serial conversion of signals.

The pixel array consists of M×N pixels. Each NDRO element $61_{i,k}$ (k=1→N)is connected to a vertical select line $60_i$, which carries vertical select pulse $\phi_{v,i}$ (i=1→M), and each NDRO element $61_{i,k}$ (i=1→M) is connected to a single vertical signal line $47_k$. As above, the NDRO elements $61_{i,k}$ (k=1→N), are accessed three times by the vertical scanner 45 in the same manner shown in prior art FIGS. 1 and 2, however in this variation, the neuron MOSFET array 28 performs a 1-by-9 local mask operation to provide smoothing. Each single vertical signal line $47_k$, (k=1→N), is connected to the output nodes of NDRO elements $61_{i,k}$ (i=1→M) as shown in FIG. 16(b). For example, NDRO elements $61_{1,1}$ through $61_{M,1}$ are connected to single vertical signal line $47_1$, and NDRO elements $61_{1,N}$ through $61_{M,N}$ are connected to single vertical signal line $47_N$.

Each single vertical signal line $47_k$ is connected to the switch array 48 where it is selectively coupled to lines $65_j$, $66_j$, and $67_j$ which, in turn, are fed to the neuron MOSFET array 28 in parallel.

Figure 17:
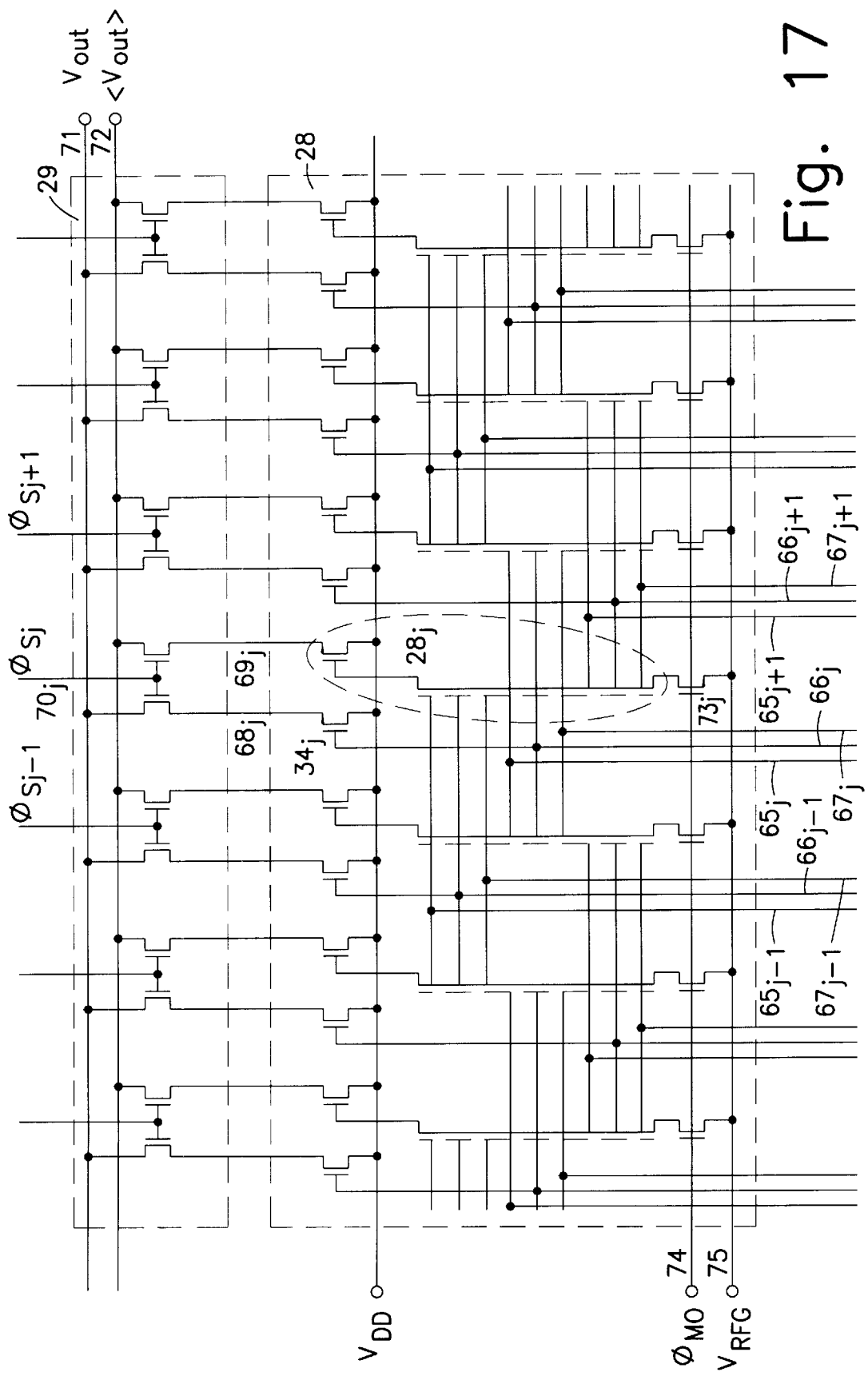
FIG. 17 shows a neuron MOSFET array and Switch array B of the circuit of FIG. 16(a) and FIG. 16(b).

The circuit configuration of the neuron MOSFET array 28 and the switch array-B, as illustrated in FIG. 16(a), is shown in FIG. 17. Each neuron MOSFET $28_j$ includes nine input gates. FIG. 18 illustrates the weights applied to each input gate of the neuron MOSFETs of FIG. 17 in implementing the 3 by 3 local mask. Referring to FIG. 17, the nine input gates of the neuron MOSFET $28_j$ are connected to the signal lines $65_{j-1}$, $65_j$, $65_{j+1}$, $66_{j-1}$, $66_j$, $66_{j+1}$, $67_{j-1}$, $67_j$, and $67_{j+1}$. In order to achieve the filter performance shown in FIG. 18, the area of the input gate which connects to the signal line $66_j$ is made 8 times larger than that of other eight input gates. The 3 by 3 pixel data are averaged in the same manner as is shown in FIG. 8. An n-MOSFET 34 corresponds to the n-MOSFET 34 in FIG. 10. In this embodiment, the floating gate of the neuron MOSFET $28_j$ is reset at the voltage $V_{RFG}$ during each horizonal blanking period $H_{BL}$ (FIG. 20). The circuit configuration of the neuron MOSFET array 28 and the switch array 48, as illustrated in FIG. 16(b), can also be implemented as shown in FIG. 17.

Figure 19A:
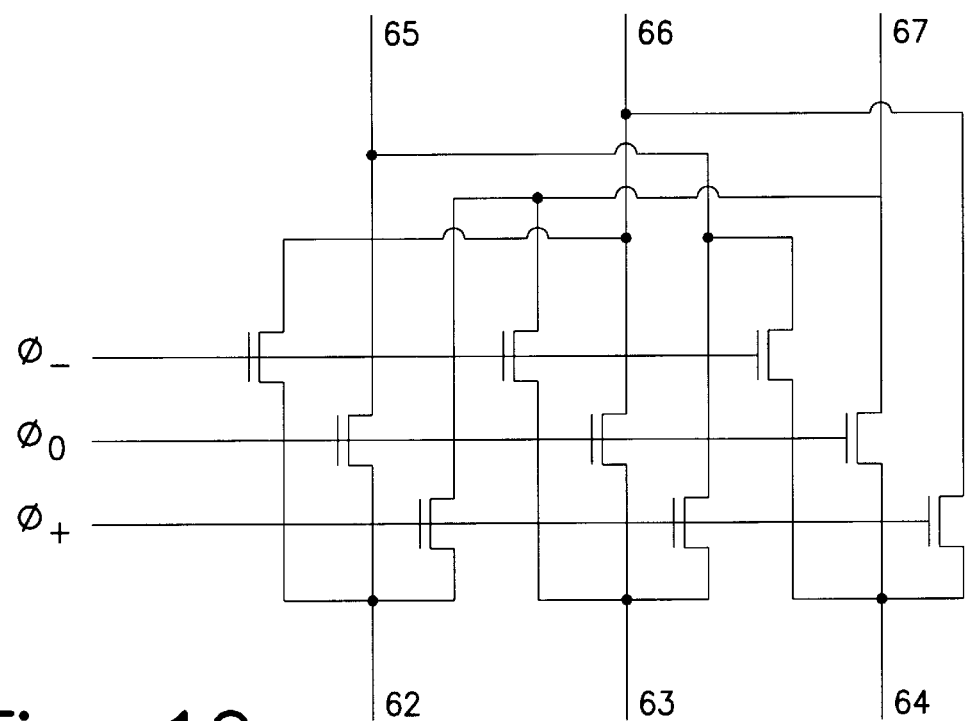
FIG. 19(a) shows a Switch array A of the circuit of FIG. 16(a).

An illustrative circuit for the switch array-A of FIG. 16(a) is shown in FIG. 19(a). The figure illustrates the case where the output nodes of the NDRO elements $61_i$ (i=1 to M) are connected to the vertical signal lines $63_j$ (j=1 to N), and the control pulse $\phi_0$ appears. Through the switch array-A, the signals on the vertical signal lines $62_j$, $63_j$, and $64_j$ are fed to the signal lines $65_j$, $66_j$, and $67_j$, respectively. Therefore, the signal from the NDRO element $61_{i,j}$ is fed to the largest input gate of the neuron MOSFET $28_j$, and signals from the neighboring NDRO elements are fed to other input gates. When the control pulse $\phi_-$ appears, the signal from NDRO element $61_{i-1,j}$ is fed to the signal line $66_j$, and, therefore, to the largest input gate of the neuron MOSFET $28_j$. When the control pulse $\phi_+$ appears, the signal from NDRO element $61_{i+1,j}$ is connected to the largest input gate.

Figure 19B:
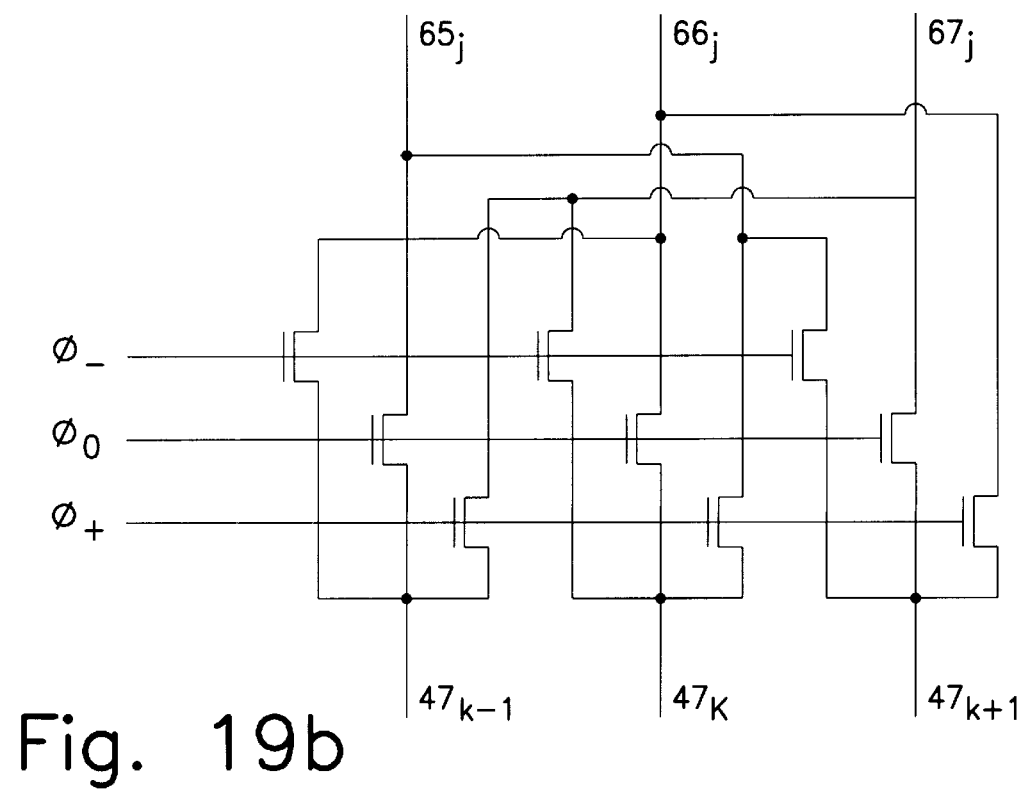
FIG. 19(b) shows a Switch Array of the circuit of FIG. 16(b).

An illustrative circuit for the switch array of FIG. 16(b) is shown in FIG. 19(b). The figure illustrates the case where the output nodes of the NDRO elements $61_{i,k}$ (i=1 to M) are connected to the vertical signal lines $47_k$ (k=1 to N), and the control pulse $\phi_0$ appears. In this example, the signals on the single vertical signal lines $47_{k-1}$, $47_k$ and $47_{k+1}$ are fed selectively, for example, to the signal lines $65_j$, $66_j$ and $67_j$. Therefore, the signal from the NDRO element $61_{i,k}$ is fed to the largest input gate of the neuron MOSFET 28, via line $66_j$ and the surrounding NDRO elements (e.g. $61_{i,k-4}$ through $61_{i,k-1}$, $61_{i,k+1}$ through $61_{i,k+5}$) are fed to the (other input gates. The operation of the switch array in this example is similar to the operation of the switch array in FIG. 19(a).

A pulse timing diagram of illustrative circuit in FIG. 19(a) is shown in FIG. 20(a). The control pulses $\phi_-$, $\phi_0$, and $\phi_+$ control the signal paths to the input gates of the neuron MOSFETs. The voltage signals which are transferred to the input gates of the neuron MOSFETs $28_j$ and to the gate of n-MOSFETs $34_j$ are held and then read out in order by the application of the horizontal select pulses $\phi_{sj}$. The time sequential pixel data and the smoothed data appear on the output line $V_{out}$71 and <$V_{out}$>72, respectively as shown. By subtracting <$V_{out}$> from $V_{out}$, edge detection is provided for an input image. A pulse timing diagram of circuit in FIG. 16(b) is illustrated in FIG. 20(b). The diagram in FIG. 20(b) is similar to the diagram in FIG. 20(a), however, in this embodiment, the vertical select pulses $\phi_{vi}$ are extended in order to sequentially apply the control pulses $\phi_-$, $\phi_0$, and $\phi_+$.

Although the preceding examples use n-channel neuron MOSFETs and photodiodes having a floating anode (i.e. floating node potential increases upon incident light), it should be understood that, for example, p-channel neuron MOSFETs and photodiodes having floating cathode characteristics can also be used in the present invention. Moreover, while the present invention has been described using photodiodes as the light receiving element, it should be understood that other light receiving elements, e.g. Static Induction Transistor (SIT) and Charged Modulation Device (CMD)could also be used. Moreover, the floating gate reset operation described with reference to FIG. 16(a) may be implemented in each of the other embodiments.

What is claimed is:

1. A smoothed output image sensor, comprising:
    (a) a plurality of neuron MOSFETs, each neuron MOSFET having at least a primary input gate, two or more secondary input gates and a MOSFET output;
    (b) a plurality of photoelectric conversion elements, each corresponding to one of the plurality of neuron MOSFETS;
    (c) each neuron MOSFET having its primary input gate coupled to its corresponding photoelectric conversion element and having each of its secondary input gates coupled to a different one of the plurality of photoelectric conversion elements;
    (d) a smoothed output;
    (e) a first switch coupled to the MOSFET output of each of the plurality of neuron MOSFETs for selectively coupling each of the plurality of neuron MOSFETs to the smoothed output of the image sensor; and
    (f) an analog signal processor generating the smoothed output, wherein the analog signal processor includes the plurality of neuron MOSFETs and the first switch.

2. The smoothed output image sensor according to claim 1, wherein the smoothed output is filtered.

3. The smoothed output image sensor according to claim 1, wherein the photoelectric conversion elements form a pixel matrix dimensioned as M-horizontal element rows by N-vertical element columns.

4. The smoothed output image sensor according to claim 3, wherein the pixel matrix includes a plurality of non-destructive read-out type pixel elements, each pixel element capable of being read out multiple times.

5. The smoothed output image sensor according to claim 4, further comprising P-vertical signal lines corresponding to each one of the N-vertical element columns, wherein each adjacent photoelectric conversion element on one of the N-vertical columns is coupled to a different one of the P-vertical signal lines, and wherein every Pth photoelectric conversion element on one of the N-vertical columns is coupled to a same one of the P-vertical signal lines.

6. The smoothed output image sensor according to claim 5, wherein the plurality of neuron MOSFETs include R-adjacent neuron MOSFETs, each of the R-adjacent neuron MOSFETs including P*R input gates, and wherein the first switch selectively couples the P-vertical signal lines on one of the corresponding N-vertical element columns to the P*R input gates of one of the R-adjacent neuron MOSFETs for obtaining a filtering characteristic.

7. The smoothed output image sensor according to claim 3, further comprising a vertical signal line corresponding to each one of the N-vertical element columns, wherein each photoelectric conversion element on one of the N-vertical columns is coupled to the vertical signal line.

8. The smoothed output image sensor according to claim 7, further comprising a second switch, wherein the plurality of neuron MOSFETs include R-adjacent neuron MOSFETs, each of the R-adjacent neuron MOSFETs including P-by-R input gates, and wherein the second switch couples the vertical signal line on the corresponding N-vertical element columns to the P-by-R input gates of one of the R-adjacent neuron MOSFETs for obtaining a filtering characteristic.

9. The smoothed output image sensor according to claim 5, further comprising a vertical scanning circuit simultaneously accessing a first set of P-vertical element rows of the photoelectric conversion elements during a first horizontal blanking period, and simultaneously accessing a second set of P-vertical element rows of the photoelectric conversion elements during a second horizontal blanking period, wherein the second set of P-vertical element rows are adjacent to the first set of P-horizontal element rows and shifted by one row, the first and second sets of P-vertical element rows overlapping.

10. The smoothed output image sensor according to claim 7, further comprising a vertical scanning circuit for sequentially accessing a first set of P-vertical element rows of the photoelectric conversion elements during a first horizontal blanking period, and sequentially accessing a second set of P-vertical element rows of the photoelectric conversion elements during the second horizontal blanking period, wherein the second set of P-horizontal element rows are adjacent to the first set of P-horizontal element rows and shifted by one row.

11. The smoothed output image sensor according to claim 5, further comprising a horizontal addressing switch, wherein each of the plurality of neuron MOSFETs includes a floating gate potential readout by the horizontal addressing switch during a second horizontal period, the second horizontal period following a switching operation of the first switch of the analog signal processor during a first horizontal period.

12. The smoothed output image sensor according to claim 7, further comprising a horizontal addressing switch, wherein each of the plurality of neuron MOSFETs includes a floating gate potential readout by the horizontal addressing switch during a second horizontal period, the second horizontal period following a switching operation of the first switch of the analog signal processor during a first horizontal period.

13. The smoothed output image sensor according to claim 3, further comprising
    (a) a plurality of MOSFETs, each having a gate input coupled to a respective one of the plurality of photoelectric conversion elements and an output;
    (b) a pixel output; and
    (c) a second switch coupled to the output of each of the plurality of MOSFETs for selectively coupling each of the plurality of neuron MOSFETs to the pixel output of the image sensor.

14. The smoothed output image sensor according to claim 13, wherein the plurality of neuron MOSFETs forms a one-dimensional neuron MOSFET array having at least one neuron array element, the one-dimensional neuron MOSFET array being formed by positioning each one of the plurality of neuron MOSFETs as the array element corresponding to each one of the N-vertical element columns of the pixel matrix, the one-dimensional neuron MOSFET array being positioned substantially adjacent to the pixel matrix.

15. The smoothed output image sensor according to claim 14, wherein the primary and the secondary input gates of each neuron MOSFET include S*T neuron MOSFET input gates, and includes a number of S-vertical elements of the plurality of photoelectric conversion elements to be smoothed and a number of T-horizontal elements of the plurality of photoelectric conversion elements to be smoothed.

16. The smoothed output image sensor according to claim 15, further including a third switch, wherein the plurality of neuron MOSFETs include T-adjacent neuron MOSFETs, the plurality of photoelectric conversion elements include S-adjacent photoelectric conversion elements on each one of the N-vertical element columns, and wherein the third switch couples each one of the S-adjacent photoelectric conversion elements with the corresponding S-by-T neuron MOSFET input gates of the T-adjacent neuron MOSFETs.

17. The smoothed output image sensor according to claim 16, wherein each one of the S*T neuron MOSFET input gates has a filtering characteristic.

* * * * *